US010447334B2

(12) United States Patent
Sharma et al.

(10) Patent No.: US 10,447,334 B2
(45) Date of Patent: Oct. 15, 2019

(54) METHODS AND SYSTEMS FOR COMPREHENSIVE SECURITY-LOCKDOWN

(71) Applicant: SecureALL Corporation, Mountain View, CA (US)

(72) Inventors: Arun Kumar Sharma, Cupertino, CA (US); Michael Wurm, Redwood City, CA (US); Richard Schaffzin, Mountain View, CA (US); Prajakta Setty, Fremont, CA (US); Deep Kumar, Fremont, CA (US)

(73) Assignee: SecureALL Corporation, Mountain View, CA (US)

( * ) Notice: Subject to any disclaimer, the term of this patent is extended or adjusted under 35 U.S.C. 154(b) by 0 days.

(21) Appl. No.: 16/019,503

(22) Filed: Jun. 26, 2018

(65) Prior Publication Data

US 2018/0316381 A1 Nov. 1, 2018

Related U.S. Application Data

(63) Continuation-in-part of application No. 15/473,224, filed on Mar. 29, 2017, now Pat. No. 10,128,893, (Continued)

(51) Int. Cl.
H04B 1/401 (2015.01)
H04W 52/02 (2009.01)
(Continued)

(52) U.S. Cl.
CPC ............ *H04B 1/401* (2013.01); *H04B 1/16* (2013.01); *H04B 5/0062* (2013.01);
(Continued)

(58) Field of Classification Search
CPC ............ H04W 52/02; H04W 52/0229; H04W 52/0235; H04B 1/16; H04B 1/401; H04B 5/0062
See application file for complete search history.

(56) References Cited

U.S. PATENT DOCUMENTS 3,097,301 A 7/1963 Sharpe et al.
4,036,178 A 7/1977 Lee et al.
(Continued)

FOREIGN PATENT DOCUMENTS

CA 2597684 A1 7/2006
DE 19614362 C1 7/1997
(Continued)

OTHER PUBLICATIONS

Notification of Transmittal of International Search Report and Written Opinion by the International Searching Authority, International Search Report, Written Opinion, in PCT application PCT/US2013/032669; dated Jul. 10, 2013.
(Continued)

*Primary Examiner* — Leon Flores
(74) *Attorney, Agent, or Firm* — Haynes and Boone, LLP

(57) ABSTRACT

An electronic lock can enter a lockdown mode in response to a lockdown command comprising a mechanical command, e.g. a button or door handle being pressed on the lock in a predefined time-series sequence, or touching the lock in a time-series sequence). Alternatively, an audio or visual command can be issued, e.g. saying certain words or making a hand gesture. The lock may require additional authentication before executing the lockdown command, e.g. recognizing an authorized electronic key. Other embodiments are also provided.

20 Claims, 14 Drawing Sheets

Related U.S. Application Data which is a continuation-in-part of application No. 14/444,949, filed on Jul. 28, 2014, now Pat. No. 9,642,089, which is a continuation-in-part of application No. 13/747,362, filed on Jan. 22, 2013, now Pat. No. 8,861,576, which is a continuation of application No. 12/500,587, filed on Jul. 9, 2009, now Pat. No. 8,472,507, said application No. 14/444,949 is a continuation-in-part of application No. 13/340,520, filed on Dec. 29, 2011, now Pat. No. 8,912,968, and a continuation-in-part of application No. 13/691,626, filed on Nov. 30, 2012, now Pat. No. 9,414,300, and a continuation-in-part of application No. 13/843,757, filed on Mar. 15, 2013, now abandoned, and a continuation-in-part of application No. 13/841,079, filed on Mar. 15, 2013, now abandoned.

(60) Provisional application No. 62/524,907, filed on Jun. 26, 2017, provisional application No. 61/858,821, filed on Jul. 26, 2013, provisional application No. 61/611,575, filed on Mar. 16, 2012, provisional application No. 61/611,577, filed on Mar. 16, 2012, provisional application No. 61/565,450, filed on Nov. 30, 2011, provisional application No. 61/428,155, filed on Dec. 29, 2010, provisional application No. 61/079,435, filed on Jul. 9, 2008.

(51) Int. Cl.
*H04B 1/16* (2006.01)
*H04B 5/00* (2006.01)

(52) U.S. Cl.
CPC ....... *H04W 52/02* (2013.01); *H04W 52/0229* (2013.01); *H04W 52/0235* (2013.01); *Y02D 70/00* (2018.01); *Y02D 70/22* (2018.01)

(56) References Cited

U.S. PATENT DOCUMENTS

| | | | |
|---|---|---|---|
| 4,071,713 | A | 1/1978 | Sencer |
| 4,200,871 | A | 4/1980 | Roeder et al. |
| 4,839,640 | A | 6/1989 | Ozer et al. |
| 4,853,704 | A | 8/1989 | Diaz et al. |
| 4,855,749 | A | 8/1989 | Defonzo |
| 4,898,010 | A | 2/1990 | Futami et al. |
| 4,936,316 | A | 6/1990 | Jewett |
| 4,978,965 | A | 12/1990 | Mohuchy |
| 5,023,597 | A | 6/1991 | Salisbury |
| 5,036,335 | A | 7/1991 | Jairam |
| 5,187,489 | A | 2/1993 | Whelan et al. |
| 5,252,960 | A | 10/1993 | Duhame |
| 5,293,087 | A | 3/1994 | Hamano et al. |
| 5,387,993 | A | 2/1995 | Heller et al. |
| 5,473,318 | A | 12/1995 | Martel |
| 5,485,577 | A | 1/1996 | Eyer et al. |
| 5,515,036 | A | 5/1996 | Waraksa et al. |
| 5,519,408 | A | 5/1996 | Schnetzer |
| 5,530,839 | A | 6/1996 | Komoto |
| 5,557,291 | A | 9/1996 | Chu et al. |
| 5,586,121 | A | 12/1996 | Moura et al. |
| 5,602,535 | A | 2/1997 | Boyles et al. |
| 5,649,099 | A | 7/1997 | Theimer et al. |
| 5,719,564 | A | 2/1998 | Sears |
| 5,774,064 | A | 6/1998 | Lambropoulos et al. |
| 5,815,811 | A | 9/1998 | Pinard et al. |
| 5,878,134 | A | 3/1999 | Handelman et al. |
| 5,922,049 | A | 7/1999 | Radia et al. |
| 5,933,074 | A | 8/1999 | Settles et al. |
| 5,940,510 | A | 8/1999 | Curry et al. |
| 5,973,611 | A | 10/1999 | Kulha et al. |
| 6,002,332 | A | 12/1999 | King |
| 6,007,338 | A | 12/1999 | Dinunzio et al. |
| 6,008,727 | A | 12/1999 | Want et al. |
| 6,020,733 | A | 2/2000 | Bradley |
| 6,041,411 | A | 3/2000 | Wyatt |
| 6,043,785 | A | 3/2000 | Marino |
| 6,064,309 | A | 5/2000 | Sellers et al. |
| 6,097,301 | A | 8/2000 | Tuttle |
| 6,107,934 | A | 8/2000 | Andreou et al. |
| 6,111,977 | A | 8/2000 | Scott et al. |
| 6,219,439 | B1 | 4/2001 | Burger |
| 6,225,950 | B1 | 5/2001 | Johansson et al. |
| 6,236,335 | B1 | 5/2001 | Goodwin, III |
| 6,304,168 | B1 | 10/2001 | Ohta et al. |
| 6,304,226 | B1 | 10/2001 | Brown |
| 6,308,181 | B1 | 10/2001 | Jarvis |
| 6,329,909 | B1 | 12/2001 | Siedentop et al. |
| 6,337,628 | B2 | 1/2002 | Campana, Jr. |
| 6,518,882 | B2 | 2/2003 | Johnson et al. |
| 6,570,487 | B1 | 5/2003 | Steeves |
| 6,690,259 | B2 | 2/2004 | Aslanidis et al. |
| 6,713,895 | B1 | 3/2004 | Krapfl |
| 6,816,083 | B2 | 11/2004 | Brandt |
| 6,837,427 | B2 | 1/2005 | Overhultz et al. |
| 6,873,703 | B1 | 3/2005 | Enriquez |
| 6,876,334 | B2 | 4/2005 | Song et al. |
| 6,888,459 | B2 | 5/2005 | Stilp |
| 6,967,587 | B2 | 11/2005 | Snell et al. |
| 6,972,660 | B1 | 12/2005 | Mongomery, Jr. et al. |
| 6,975,202 | B1 * | 12/2005 | Rodriguez ......... G07C 9/00103 340/10.1 |
| 6,989,732 | B2 | 1/2006 | Fisher |
| 7,012,503 | B2 | 3/2006 | Nielsen |
| 7,019,617 | B2 | 3/2006 | Pratt et al. |
| 7,106,246 | B1 | 9/2006 | Lindell |
| 7,142,838 | B2 | 11/2006 | Rotzol |
| 7,149,849 | B2 | 12/2006 | Wall et al. |
| 7,183,897 | B2 | 2/2007 | Tang et al. |
| 7,199,634 | B2 | 4/2007 | Cho et al. |
| 7,227,506 | B1 | 6/2007 | Lewis, Jr. |
| 7,301,437 | B2 | 11/2007 | Sasaki et al. |
| 7,366,812 | B2 | 4/2008 | Lambourn et al. |
| 7,446,644 | B2 | 11/2008 | Schaffzin et al. |
| 7,463,134 | B1 | 12/2008 | Stilley |
| 7,487,538 | B2 | 2/2009 | Mok |
| 7,499,283 | B2 | 3/2009 | De Los Santos et al. |
| 7,526,934 | B2 | 5/2009 | Conforti |
| 7,577,496 | B2 | 8/2009 | Walker et al. |
| 7,605,689 | B2 | 10/2009 | Hein et al. |
| 7,617,522 | B2 | 11/2009 | Schmidt et al. |
| 7,652,632 | B2 | 1/2010 | Shtrom |
| 7,668,830 | B2 | 2/2010 | Hakala |
| 7,688,179 | B2 | 3/2010 | Kurpinski et al. |
| 7,689,196 | B2 | 3/2010 | Hutchinson et al. |
| 7,755,482 | B2 | 7/2010 | Hubbard |
| 7,792,861 | B2 | 9/2010 | Kudoh et al. |
| 7,804,458 | B2 | 9/2010 | Montgomery et al. |
| 7,805,169 | B2 | 9/2010 | Hicks, III |
| 7,844,377 | B2 | 11/2010 | Oota et al. |
| 7,856,448 | B2 | 12/2010 | Sheehan |
| 7,894,810 | B2 | 2/2011 | Feher |
| 7,898,382 | B2 | 3/2011 | Berstis et al. |
| 7,933,835 | B2 | 4/2011 | Keane et al. |
| 7,933,925 | B2 | 4/2011 | Sreedhar |
| 7,953,823 | B2 | 5/2011 | Rider et al. |
| 8,005,777 | B1 | 8/2011 | Owen et al. |
| 8,031,725 | B2 | 10/2011 | Calin |
| 8,044,797 | B2 | 10/2011 | Brommer et al. |
| 8,059,628 | B2 | 11/2011 | Bradley et al. |
| 8,102,239 | B2 | 1/2012 | Woo |
| 8,141,296 | B2 | 3/2012 | Bem |
| 8,149,087 | B2 | 4/2012 | Brillon |
| 8,194,571 | B2 | 6/2012 | Herrmann et al. |
| 8,224,313 | B2 | 7/2012 | Howarter et al. |
| 8,228,165 | B2 | 7/2012 | Marchetto et al. |
| 8,233,420 | B2 | 7/2012 | Choi et al. |
| 8,244,762 | B2 | 8/2012 | Cimino |
| 8,245,291 | B2 | 8/2012 | Kumar et al. |
| 8,249,910 | B2 | 8/2012 | Wellman et al. |
| 8,251,287 | B2 | 8/2012 | Kochevar |
| 8,258,920 | B2 | 9/2012 | Crucs |

(56) References Cited

U.S. PATENT DOCUMENTS

| | | |
|---|---|---|
| 8,271,336 B2 | 9/2012 | Mikurak |
| 8,279,077 B1 | 10/2012 | Liff et al. |
| 8,310,340 B2 | 11/2012 | Sikora et al. |
| 8,319,605 B2 | 11/2012 | Hassan et al. |
| 8,340,975 B1 | 12/2012 | Roseberger |
| 8,391,260 B1 | 3/2013 | Kopikare et al. |
| 8,428,079 B1 | 4/2013 | Lambert et al. |
| 8,473,192 B2 | 6/2013 | Hannah et al. |
| 8,682,347 B2 | 3/2014 | Hepo-Oja |
| 8,693,453 B2 | 4/2014 | Priyantha et al. |
| 8,717,923 B2 | 5/2014 | Vedantham et al. |
| 9,007,173 B2 | 4/2015 | McIntyre et al. |
| 9,007,195 B2 | 4/2015 | Ghabra |
| 2002/0013909 A1 | 1/2002 | Baumeister et al. |
| 2002/0034321 A1 | 3/2002 | Saito et al. |
| 2002/0099945 A1 | 7/2002 | McLintock et al. |
| 2002/0111919 A1 | 8/2002 | Weller et al. |
| 2003/0034877 A1 | 2/2003 | Miller et al. |
| 2003/0046578 A1 | 3/2003 | Brown et al. |
| 2003/0119568 A1 | 6/2003 | Menard |
| 2003/0142737 A1 | 7/2003 | Tarng |
| 2003/0174095 A1 | 9/2003 | Sievenpiper |
| 2003/0214450 A1 | 11/2003 | Lynch et al. |
| 2004/0174271 A1 | 9/2004 | Welles et al. |
| 2004/0192222 A1 | 9/2004 | Vaisanen et al. |
| 2004/0227656 A1 | 11/2004 | Asakura et al. |
| 2004/0229560 A1 | 11/2004 | Maloney |
| 2004/0259544 A1 | 12/2004 | Amos |
| 2005/0040933 A1 | 2/2005 | Huntzicker |
| 2005/0063348 A1 | 3/2005 | Donovan |
| 2005/0138046 A1 | 6/2005 | Miettinen et al. |
| 2005/0215274 A1 | 9/2005 | Matson et al. |
| 2006/0008085 A1 | 1/2006 | Matsuo |
| 2006/0018139 A1 | 1/2006 | Kilomeitsev et al. |
| 2006/0030373 A1 | 2/2006 | Park |
| 2006/0100000 A1 | 5/2006 | Marples et al. |
| 2006/0129847 A1 | 6/2006 | Pitsos |
| 2006/0132284 A1 | 6/2006 | Murphy et al. |
| 2006/0136390 A1 | 6/2006 | Zhao et al. |
| 2006/0154708 A1 | 7/2006 | Bogner |
| 2006/0156018 A1 | 7/2006 | Lauer et al. |
| 2006/0164208 A1 | 7/2006 | Schaffzin et al. |
| 2006/0222118 A1 | 10/2006 | Murthy et al. |
| 2007/0001816 A1 | 1/2007 | Lindley et al. |
| 2007/0038344 A1 | 2/2007 | Oota et al. |
| 2007/0073694 A1 | 3/2007 | Picault et al. |
| 2007/0103367 A1 | 5/2007 | Wang |
| 2007/0105548 A1 | 5/2007 | Mohan et al. |
| 2007/0111746 A1 | 5/2007 | Anderson |
| 2007/0149257 A1 | 6/2007 | Cheresh et al. |
| 2007/0176739 A1 | 8/2007 | Raheman |
| 2007/0183449 A1 | 8/2007 | Beagley et al. |
| 2007/0188305 A1 | 8/2007 | Drucker |
| 2007/0273478 A1 | 11/2007 | Chevalier |
| 2007/0286136 A1 | 12/2007 | Rittle et al. |
| 2007/0296545 A1 | 12/2007 | Clare |
| 2008/0031208 A1 | 2/2008 | Abhishek et al. |
| 2008/0062120 A1 | 3/2008 | Wheeler et al. |
| 2008/0084836 A1 | 4/2008 | Baird et al. |
| 2008/0088514 A1 | 4/2008 | Su et al. |
| 2008/0129446 A1 | 6/2008 | Vader |
| 2008/0129448 A1 | 6/2008 | Reichling |
| 2008/0191009 A1 | 8/2008 | Gressel et al. |
| 2008/0231522 A1 | 9/2008 | Montgomery et al. |
| 2008/0252432 A1 | 10/2008 | Hein et al. |
| 2008/0290990 A1 | 11/2008 | Schaffzin et al. |
| 2008/0303601 A1 | 12/2008 | Young |
| 2008/0316128 A1 | 12/2008 | Apostolos |
| 2009/0007274 A1 | 1/2009 | Martinez et al. |
| 2009/0110035 A1 | 4/2009 | Sutton et al. |
| 2009/0238308 A1 | 9/2009 | Weiner et al. |
| 2009/0262036 A1 | 10/2009 | Thevenard et al. |
| 2009/0267734 A1 | 10/2009 | Kwon |
| 2009/0267747 A1 | 10/2009 | Rivest et al. |
| 2009/0287827 A1 | 11/2009 | Horn et al. |
| 2009/0303131 A1 | 12/2009 | Schano |
| 2009/0305628 A1 | 12/2009 | Vavik |
| 2010/0035539 A1 | 2/2010 | Yoshida et al. |
| 2010/0036861 A1 | 2/2010 | Srihari et al. |
| 2010/0040120 A1 | 2/2010 | Sharma |
| 2010/0052931 A1 | 3/2010 | Kolpasky et al. |
| 2010/0075655 A1 | 3/2010 | Howarter et al. |
| 2010/0077474 A1 | 3/2010 | Yacoub et al. |
| 2010/0141381 A1 | 6/2010 | Bliding et al. |
| 2010/0164683 A1 | 7/2010 | Sharma et al. |
| 2010/0167783 A1 | 7/2010 | Alameh et al. |
| 2010/0260114 A1 | 10/2010 | Vermani et al. |
| 2010/0283579 A1 | 11/2010 | Kraus et al. |
| 2011/0001606 A1 | 1/2011 | Charych |
| 2011/0069649 A1 | 3/2011 | Gobriel et al. |
| 2011/0102164 A1 | 5/2011 | Ghabra |
| 2011/0161697 A1 | 6/2011 | Qi et al. |
| 2011/0221565 A1 | 9/2011 | Ludlow et al. |
| 2012/0030733 A1 | 2/2012 | Andrews et al. |
| 2012/0045989 A1 | 2/2012 | Suumaki et al. |
| 2012/0096564 A1 | 4/2012 | Li |
| 2012/0170751 A1 | 7/2012 | Wurm |
| 2012/0221189 A1 | 8/2012 | Konet et al. |
| 2012/0274444 A1 | 11/2012 | Micali et al. |
| 2012/0296685 A1 | 11/2012 | Nishimura et al. |
| 2012/0305340 A1 | 12/2012 | Wu |
| 2013/0006680 A1 | 1/2013 | O'Sullivan |
| 2013/0028293 A1 | 1/2013 | Makh et al. |
| 2013/0054976 A1 | 2/2013 | Brown et al. |
| 2013/0109313 A1 | 5/2013 | Kneckt et al. |
| 2013/0109314 A1 | 5/2013 | Kneckt et al. |
| 2013/0155925 A1 | 6/2013 | Priyantha et al. |
| 2013/0237193 A1 | 9/2013 | Dumas et al. |
| 2014/0281566 A1 | 9/2014 | Narendra et al. |
| 2015/0102904 A1 | 4/2015 | Oh et al. |
| 2015/0135310 A1 | 5/2015 | Lee |
| 2015/0263663 A1 | 9/2015 | Lazo et al. |

FOREIGN PATENT DOCUMENTS

| | | |
|---|---|---|
| EP | 0808971 A2 | 11/1997 |
| EP | 1184236 A2 | 3/2002 |
| EP | 1450312 A2 | 8/2004 |
| EP | 1841630 A2 | 10/2007 |
| KR | 100361/2007 A1 | 10/2007 |
| TW | 200626782 A | 8/2006 |
| WO | 2005059752 A1 | 6/2005 |
| WO | 2006/078362 A2 | 7/2006 |

OTHER PUBLICATIONS

European Search Report dated Feb. 9, 2010, in European Application No. 05849475.8.
Fischetti, M. titled Keyless Entry, Scientific American, 3 pages, (Jan. 2005).
Written Opinion of the International Searching Authority, International Application No. PCT/US05/044250, dated Aug. 24, 2007, 5 pages.
International Preliminary Report on Patentability, International Application No. PCT/US05/044250, dated Sep. 18, 2007, 2 pages.
International Search Report issued by the International Searching Authority for PCT application No. PCT/US05/044250, dated Nov. 14, 2007, 2 pages.
John Long titled SiGe Radio Frequency ICs for Low-Power Portable communication; Proceedings of the IEEE, vol. 93, No. 9, Sep. 2005. 26 pages.
International Search Report and Written Opinion issued by the International Searching Authority dated Feb. 19, 2010 for PCT application No. PCT/US2011/067981. 10 pages.
International Search Report and Written Opinion issued by the International Searching Authority, dated Feb. 19, 2010 for PCT application. No. PCT/US2009/050180.
Liapine, A., titled Resonant Cavities as Beam Position Monitors, Part 3. Analog Signal Processing. Accelerator Physicist, Department of Physics, University of London, UK. Received Apr. 10, 2012. http://www.hep.ucl.ac.uk/~liapine. 6 pages.

(56) References Cited

OTHER PUBLICATIONS

Barry, John R., titled Carrier Synchronization for Homodyne and Heterodyne Detection of Optical Quadriphase-Shift Keying. Department of EECS, University of California, issued Jul. 2, 1992. 36 pages.

Mirabbasi, Shahriar et al. titled Classical and Modern Receiver Architectures. IEEE Communications Magazines issued Nov. 2008. 8 pages.

Office Action dated Jul. 2, 2013 in Japanese patent application No. 2011-517638 based on PCT application No. PCT/US2009/050180.

English Translation of Office Action dated Jul. 2, 2013 in Japanese patent application No. 2011-517638.

Partial English Translation of Japanese application No. 2005-286745.

Polastre, Joseph et al. titled Versatile Low Power Media Access for Wireless Sensor Networks. SenSys '04, Nov. 3-5, 2004. Baltimore, Maryland.

A. El-Hoiydi et al., titled Low Power MAC Protocols for Infrastructure Wireless Sensor Networks. Nov. 15, 2012.

Ye, Wei et al., titled An Energy-Efficient MAC Protocol for Wireless Sensor Networks, (2002), 7 pages.

CMPE 25: Wireless and Mobile Networking SET 3p: Medium Access Control Protocols, 2004.

Buettner, Michael et al., titled X-MAC: A Short Preamble MAC Protocol for Duty-Cycled Wireless Sensor Networks. SenSys '06, Nov. 1-3, 2006.

Chao, Chih-Min et al., titled A Quorum-Based Energy-Saving MAC Protocol Design for Wireless Sensor Networks. IEEE Transactions on Vehicular Technology, vol. 59, No. 2, Feb. 2010.

Tseng, Yu-Chee et al., titled Power-Saving Protocols for IEEE 802.11-Based Multi-Hop Ad Hoc Networks. IEEE INFOCOM 2002.

Li, Yuan et al., titled Energy and Latency Control in Low Duty Cycle MAC Protocols. USC/ISI Technical Report ISI-TR-595, Aug. 2004.

Dutta, Prabal et al., titled Practical Asynchronous Neighbor Discovery and Rendezvous for Mobile Sensing Applications. SenSys '08, Nov. 5-7, 2008, Raleigh, NC, USA (ACM).

Kandhalu, Arvind et al., titled U-Connect: A Low-Latency Energy-Efficient Asynchronous Neighbor Discovery Protocol. IPSN '10, Apr. 12-16, 2010, Stockholm, Sweden (ACM).

Lai Shouwen, titled Heterogeneous Quorum-Based Wakeup Scheduling for Duty-Cycled Wireless Sensor Networks, Dissertation. May 5, 2009, 71 pages.

Meier, Andreas titled Analyzing MAC Protocols for Low Data-Rate Applications. May 16, 2006. Computer Engineering and Networks Laboratory. 16 pages.

International Search Report and Written Opinion issued by the International Searching Authority, dated Mar. 14, 2013 for PCT application No. PCT/US2012/067478. 7 pages.

International Search Report and Written Opinion issued by the International Searching Authority on Jul. 8, 2013 for PCT application No. PCT/US2013/032620. 16 pages.

\* cited by examiner

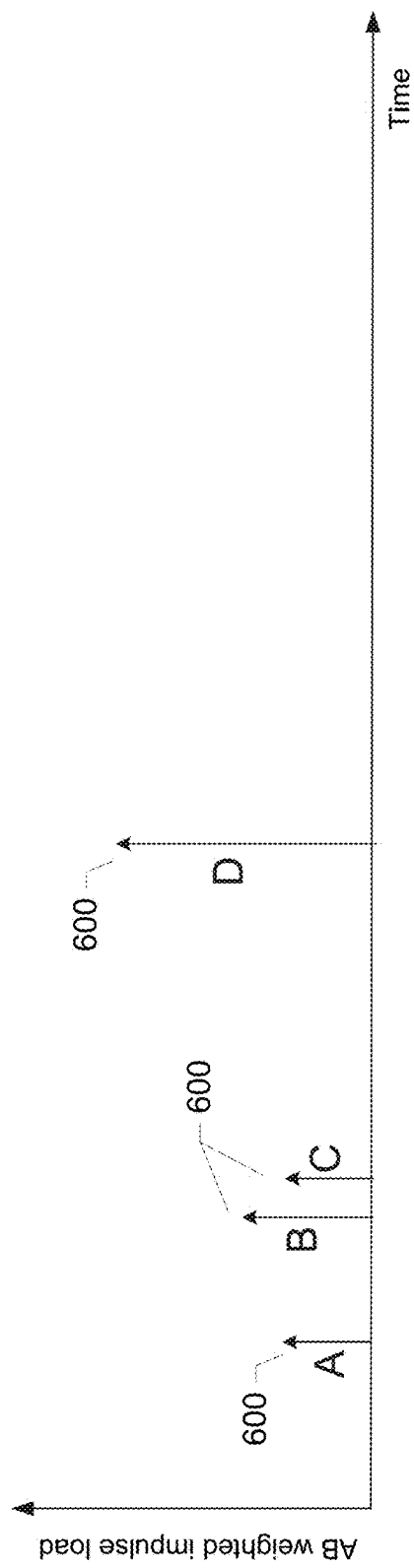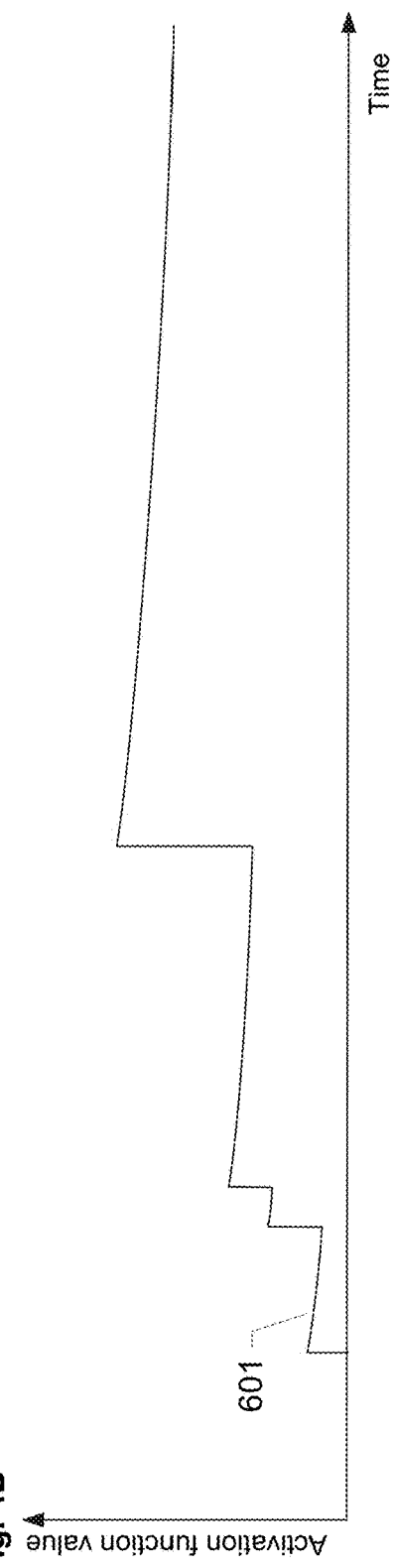

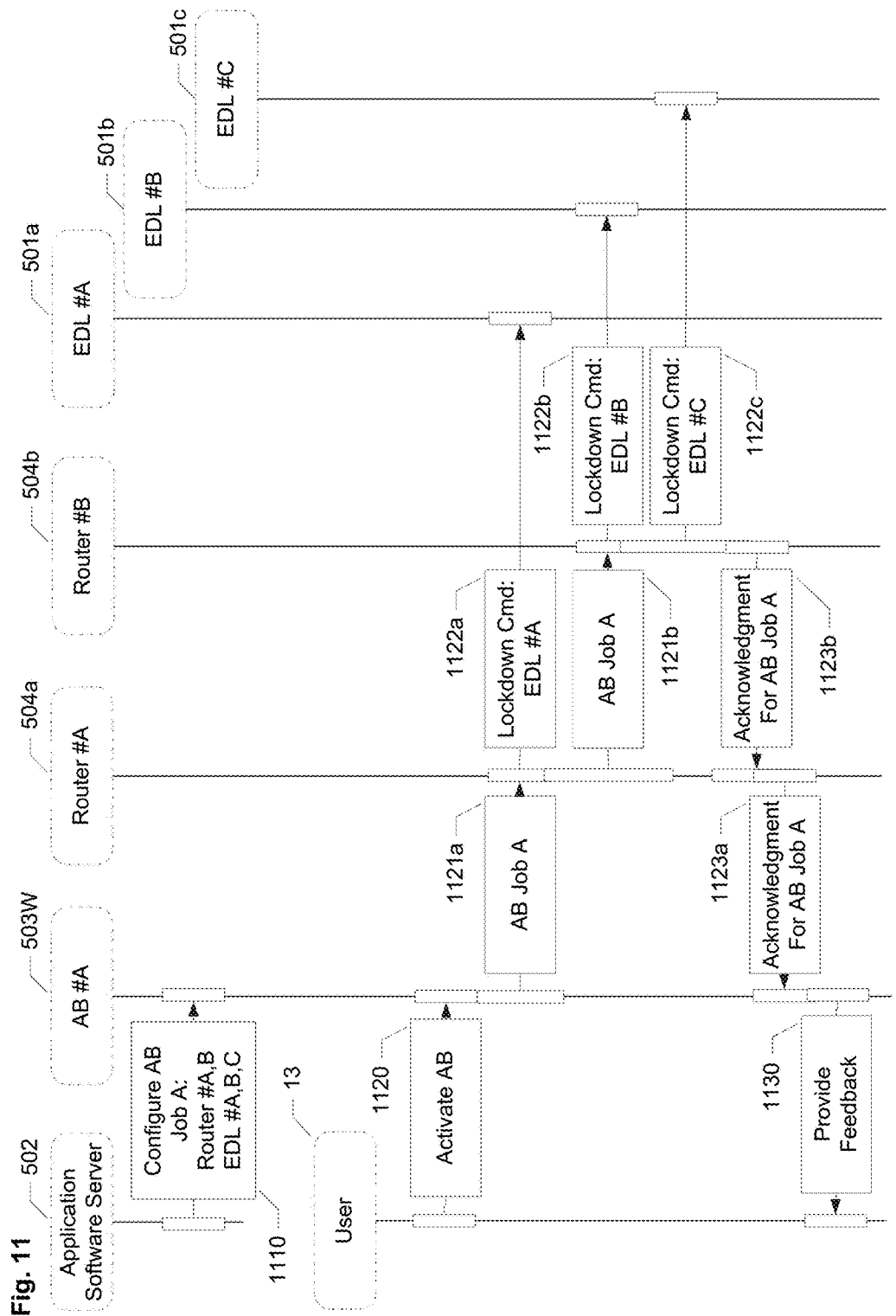

METHODS AND SYSTEMS FOR COMPREHENSIVE SECURITY-LOCKDOWN

CROSS REFERENCE TO RELATED APPLICATIONS

The present application claims priority of U.S. provisional patent application No. 62/524,907, filed Jun. 26, 2017, incorporated herein by reference.

This application is also a continuation-in-part of U.S. patent application Ser. No. 15/473,224 (published as US 2017/0338848 A1) filed on Mar. 29, 2017, incorporated herein by reference, which is a continuation-in-part of U.S. patent application Ser. No. 14/444,949 filed Jul. 28, 2014 (now U.S. Pat. No. 9,042,089 B2), which application is incorporated herein by reference.

The aforementioned application Ser. No. 14/444,949 is also:

1. A continuation-in-part (CIP) of U.S. patent application Ser. No. 13/747,362 filed on Jan. 22, 2013, incorporated herein by reference, which is a continuation of U.S. patent application of U.S. patent application Ser. No. 12/500,587 filed Jul. 9, 2009 (now U.S. Pat. No. 8,472,507), which application is incorporated herein by reference, which claims priority of U.S. provisional patent application 61/079,435 filed Jul. 9, 2008, incorporated herein by reference.
2. A continuation-in-part of U.S. patent application Ser. No. 13/340,520, filed Dec. 29, 2011, incorporated herein by reference, which claims priority of U.S. provisional patent application No. 61/428,155 filed Dec. 29, 2010, incorporated herein by reference.
3. A continuation-in-part of U.S. patent application Ser. No. 13/691,626 filed Nov. 30, 2012, incorporated herein by reference, which claims priority of U.S. provisional patent application No. 61/565,450 filed Nov. 30, 2011, incorporated herein by reference.
4. A continuation-in-part of U.S. patent application Ser. No. 13/843,757 filed Mar. 15, 2013, incorporated herein by reference, which claims priority of U.S. provisional patent application No. 61/611,577 filed Mar. 16, 2012, incorporated herein by reference.
5. A continuation-in-part of U.S. patent application Ser. No. 13/841,079 filed Mar. 15, 2013, incorporated herein by reference, which claims priority of U.S. provisional patent application No. 61/611,575 filed Mar. 16, 2012, incorporated herein by reference.

NOTATION AND ABBREVIATIONS

EDL: Electronic Door Lock
GUI: Graphical User Interface
LCD: Local Coordinator Device
ASS: Application Software Server. Server side of the Application Software (portion of the application software running on the server, distinct from the portion of the application software that runs on the user's computer).
AB: Action Button.
AB location: corresponds to the physical location where the AB is located. Software based AB 503S may be assigned a location or optionally have no location.
ABN: Action Button Notification
ACSA: Access control software application
ACS: Access Control System, comprising an ASS, ACSA, PAC, a set of EDLs and Ekeys; including data communication means between the constituents. Also referred as the building security system.
Ekey/E-Key: Electronic Key (for door access control, authorized access to resources/computer/lab equipment)
LR-Ekey: A type of Ekey that communicates with the EDL using long range radio communication. Typically uses far field communication (as against near field communication) methodology. Non limiting examples: BLE (Bluetooth Low Energy) based credentials, Active RFID based credentials/tokens & UKey (made by SecureALL).
UKey/Ukey: A type of LR-Ekey made by SecureALL that works in hands-free manner.
SS: Security Server computer, comprising one or more computers that run/host some or all components of the ASS.
WFE: Workflow Engine (software to implement logical decision making. Example: a software program, a program written in software scripting language, a Workflow software engine, etc).
LLD: Local Lockdown
RLD: Remote Lockdown.
Operator: A person who uses, operates, configures or interacts with ASS via a GUI application (or AB).
Zone: Another name for Action Area. Zone is a collection of EDLs. It is also used to refer to set of doors that correspond to the collection of EDLs.
Action Area: Another name for Zone

FIELD OF INVENTION

This invention relates to the lockdown mechanism in an Access Control System ACS.

BACKGROUND OF THE INVENTION

Embodiments described herein relate to the field of security system, access control, business process. The embodiments described herein relate to the door lock hardware, cryptographically secured wireless communication network, multi-tiered client-server software architecture. Some embodiments relate to comprehensive realization of intelligent, robust and secure methods to secure doors in the event of violent threat posed by a perpetrator who wants to harm people in a set of building and rooms.

Physical access control locks mounted on a door have existed for centuries. Lock state can be put in secure or open state by manipulating the lock with a specific key. Mechanical keys suffer from a small range of unique keying possibilities (for example a 7 lever lock has only approximately 20,000 unique key cuts) and it is easy to duplicate a key without the knowledge of the key's owner. Recently, electronic door locks (EDLs) have been invented that employ non-mechanical features to provide a very large range of possible keying options (For example a 20 bit code provides approximately one million unique keys) using an electronic key ("E-Key" or "Ekey"). Adding cryptographic protection further secures information privacy stored in EDLs and Ekeys. An Ekey is used in many situations to unlock doors or otherwise provide access to a secure area. Many new hotels and business places, residences and the like utilize such Ekeys, often in the form of electronically readable cards. Such Ekeys can be in the form of card keys, keyfobs, tokens and the like. Examples of Ekey technologies can include magnetic stripe cards, smart cards, near field radio frequency communications ("NFC"), radio frequency identification ("RFID"), passive RFID, active RFID, and so forth. Whichever technology is used, the Ekey typically communicates with an EDL or other suitable electronic lock or access device. The EDL or other electronic access device can then read a particular identification ("ID") code on the Ekey (often supported by a cryptographic security means) and provide or deny access based upon whether the ID code is acceptable to the EDL.

Many types of Ekey and EDL technologies require that the card or key fob being used be physically placed into contact with the EDL, such as in the case of magnetic stripe cards, smart cards, memory chip cards and fobs. Of course, such applications tend to require the user to physically manipulate the Ekey, such as to insert a card into a slot in the EDL. Other types of technologies can allow for applications where no physical contact is required between the Ekey and EDL, such as in the case of NFC cards and readers. Unfortunately, NFC applications typically need the Ekey to be within a few centimeters of the EDL or other reader, such that users are usually required to handle or otherwise manipulate the Ekey to some degree.

Long range keys ("LR-Keys") operate like Ekeys albeit at much greater distance. A typical challenge of long distance operation is avoiding inadvertently opening the EDL not just from outside the door but inside the door (the latter being a serious problem).

Recent shootings at school and university campuses have demonstrated the importance of protecting staff and students from harm in the event of a shooter on campus. One component of the protection strategy involves preventing the shooter from entering buildings and rooms that may be populated by potential victims.

One protection method is called 'Lockdown', where entrance through doors is limited by the door lock to a very small set of people, such as police and emergency responders. Even if the shooter possesses a valid Ekey (possibly obtained by threat of force from an innocent person having normal access), the shooter would not be able to unlock a door lock that is in 'Lockdown' mode. The shooter would thus be obstructed from entering a room full of innocent people (potential victims).

In a classical (prior art) access control system (also known as building security system), the lockdown command is issued centrally, for example by campus police, after an incident is reported. Campus police would initiate the lockdown on an access control system's control station that is connected to EDLs through a wired or wireless network, and the access control system would affect lockdown commands to the EDLs over that network. One disadvantage of this approach is a long response time: A person on campus has to call or by some means notify campus police. Police then have to manually activate the lockdown and the lockdown command has to propagate to the door readers. Another potential disadvantage is that this method has one or more single points of failure, including the access control system's server (central control station) and its network connections. To overcome this disadvantage, one has to invest in fail-safe or fault-tolerant:

a. Server computer hardware & storage sub-system
   b. Server software system
   c. Network switches and cabling all of which is extremely expensive to build, maintain, certify and check system integrity at all times. It is rare to find an enterprise that is willing to invest so heavily in such a system, due to above mentioned difficulties.

A second prior art method that is sometimes employed is to allow users to initiate a lockdown manually on individual doors. While this has the advantage that it immediately protects the individual user who activates the lockdown, it does not protect people in other rooms who are not yet aware of the danger.

There are some prior art ACS that employ wireless EDLs that allow lockdown of all EDLs connected to a set of wireless routers (that provide wireless connectivity to the wireless EDLs). Such systems are inflexible because the need for locking down a specific set of EDLs can rarely be physically controlled such that a specific wireless router provides connectivity only to the desired set of EDLs (nothing more and nothing less).

In this disclosure we present methods and systems that help to overcome many disadvantages of the traditional methods that were described above, and other disadvantages, and we provide novel functionality.

BRIEF DESCRIPTION OF THE DRAWINGS

FIG. 4A shows an example of time sequence of occurrences of Activation function inputs of the present disclosure.

FIG. 4B shows an example of Activation function value graph of the present disclosure.

FIG. 11 shows an embodiment of the activity diagram of distributed lockdown of the present disclosure.

DETAILED DESCRIPTION OF THE INVENTION

Some embodiments of the invention use a special type of LR-Ekey called "Ukey", available from SecureALL Corporation of California. A Ukey has many breakthrough technologies that enable a hands-free key to provide door access. A Ukey also has far field wireless communication capability allowing it to communicate with a compatible EDL or wireless router devices located at substantial distance. But the invention is not limited to such embodiments.

An Ekey and an EDL may have electronic components as described, for example, in US pre-grant publication US 2006/0164208 A1, incorporated herein by reference. The Ekey and EDL components can be modified to provide the functionality according to some embodiments of the present invention.

In the figures, elements based on the same reference number (E.g. 503, 503U, 503D, 503W, 503L, 503R; or 504, 504D, 504L) denote the same or similar parts, having the same or similar functionality.

Figure 1A:
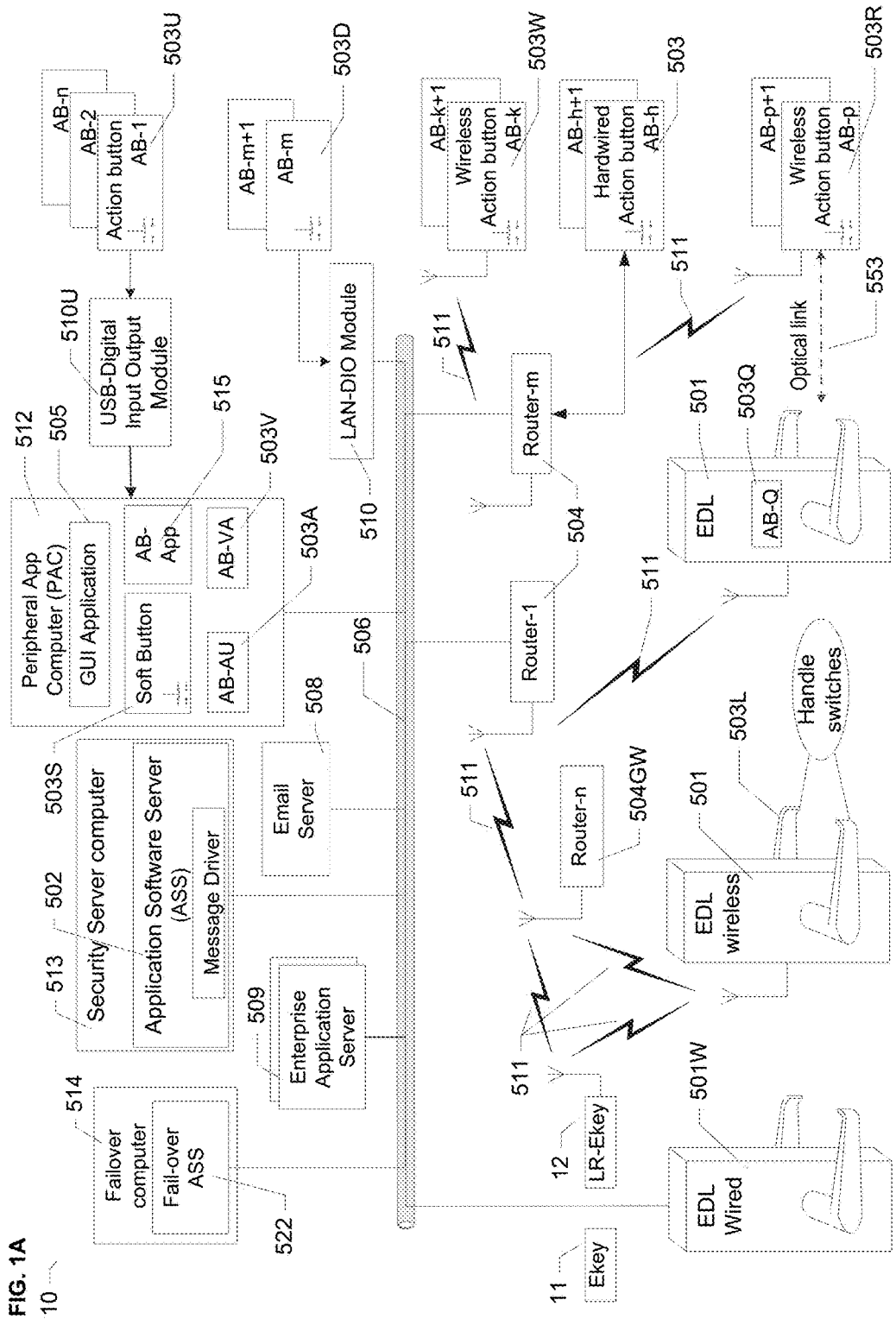
FIG. 1A shows an embodiment of the Access Control System of the present disclosure.

FIG. 1A shows network topology of an ACS 10 that is an embodiment of the disclosed invention. The system comprises the following elements:

a. A data network which may be wired or wireless or a combination thereof, interconnecting various components of the ACS.
  i. Wired routers and wireless router devices 504 could be part of this network. Router 504 forms a bridge between wired and wireless networks. The wireless data networks could further comprise a mesh of wireless routers 504 where some routers 504 have upstream wired data network connectivity 506 (E.g. LAN) while others routers 504GW have upstream wireless data network connectivity. Router 504GW provides wireless-based store & forward style routing between its wireless network of downstream wireless devices and its up-stream router 504.
  ii. An LR-Ekey 12, EDL 501 or an AB 503W may use a wireless link 511 to communicate with a nearby wireless Router 504. A wired EDL 501W connects to the network via a non-wireless router.
  iii. Computers like SS computer 513, PAC computer 512 and third party applications 509 like Email server 508, enterprise application server 509, etc are connected to the network 506 though conventional LAN/WAN backbone technologies (E.g. Cisco's Layer 2 and 3 switches and routers).

b. Electronic door locks (EDLs) 501 can be configured to grant access to authorized users carrying valid electronic Ekeys 11. The EDLs can be of various types; some EDL types are connected by a wireless network while another EDL type 501W connects via a wired (e.g. copper, optical) network. EDLs 501 have means to communicate with Ekeys 11. Some Ekeys using near field communication or far field communication communicate with compatible radio transceivers built into EDLs. LR-Ekeys 12 like SecureALL's UKey has the ability to wirelessly communicate over a wireless link with an EDL 501 and with wireless router 504.

c. A Security Server (SS) computer 513 runs an application software server (ASS) 502 that is able to communicate with various other components of the ACS such as EDLs, and allows peripheral application computer (PAC) 512 (E.g. personal-computer, smart-phone, iPad, tablet computer etc.) running a GUI application 505 to connect to it (such components allow operators to monitor and control the system). The ASS 502 is the server side of the Application Software (the application software running on the server, distinct from the portion of the application software that runs on the PAC 512). The ASS 502 can be configured to integrate with various other enterprise applications, such as email, web-portal etc. In some embodiments SS computer could comprise multiple server computers whereby various components of the ASS 502 could be distributed across the available server computers.

d. Peripheral application computers (PAC) 512 (some with a graphical user interface (GUI) 505) are connected via the network 506 with the ASS. GUI Application 505 allows operators to monitor & control the system and respond to alarms in some embodiments. In some other embodiments peripheral computer 512 may host application software other than GUI application (E.g. software to support AB functions) like 'Soft Button' application 503S or 'Action Button' software application 515 for communicating with a USB-IO module 510 U and/or LAN-IO module 510 that interface with an AB.

e. Action Buttons (AB) 503 come in various forms and are connected to the system in different ways. An action button allows a user to press or manipulate a sensor (E.g. button) in a certain way (E.g. rapidly press it three times, long pressing for a duration>3 seconds, etc.) to indicate the user's intent to generate a specific message (amongst a plurality of available messages), signal distress or issue a specific command. Thus some types of ABs could generate more than one type of message depending on how the AB is manipulated. ABs could optionally provide a feedback signal to the user in the form of visual information (E.g. LED indication, text), audible information (E.g. beep, voice annunciation) or haptic (tactile) response. An artifact (a physical casing) may incorporate one or more Action button(s) in its package. Time-series changes of AB sensor output (over a short period) is detected and mapped to correspond to one amongst many (predefined) possible signals, and a message corresponding to that signal (E.g. a switch button pressed for 5 seconds continuously, corresponds to an unlock signal and the corresponding message is "DoorUnlock signal"; on the other hand when the switch button is pressed 3 times within a 4-second interval, it corresponds to a lockdown signal and the corresponding message is "Lockdown signal").
  i. A Message is a data packet that can be transmitted over the network. Amongst many non-limiting types of messages that can be sent there are broadly three types of messages:
    1. Signal message: used to indicate asynchronous occurrence of an event. For example: Lockdown signal message (or Lockdown request message): A message indicating that an AB has been triggered (and as a response a set of EDLs should be put into lockdown mode; or if the AB is part of an EDL, the message also indicates that this EDL is now in lockdown mode).
    2. Command message: used to request execution of specified command. E.g. Lockdown command message is a message that instructs an EDL to go into lockdown mode.
    3. Acknowledgement message: Used to acknowledge a command message. E.g. Lockdown confirmation message (same as Lockdown acknowledgment message): A message sent by an EDL in response to a Lockdown command message to confirm that the command was executed and the EDL is in lockdown mode.

Action buttons (AB) could be classified into two categories:

a) Hardware based. This is a physical embodiment of an AB. It can be further subdivided into:
  i) Intelligent ABs. Are Action Buttons that comprise a computer/micro-computer with a means of data connection with the network. Non-limiting examples are:
    (1) Wireless AB 503W that has wireless communication capability to send a message to nearby wireless Router 504.

(2) EDL embedded AB 503L. The AB is embedded/subsumed in the EDL. The EDL could be configured to sense the pressing of the AB and optionally take some responsive action (like put the EDL into 'Lockdown' mode) and optionally send an AB signal message to the network via the EDL's wired or wireless data network link. An embodiment of this type of AB could be an explicit (physical) push-button on the EDL. Another embodiment of this type of AB is where the user physically manipulates a sensor on the EDL; the sensor detects the type of manipulation (e.g. the number of times that the user an EDL handle within a given time period) to generate the corresponding message. Non-limiting example of this type of sensor are:
  (a) Switch(es) that sense turning of the inside and/or outside handle(s) of the EDL
  (b) Radio Frequency (RF) radiation based proximity sensing of a user's hand or hand gesture
  (c) Capacitive proximity sensing
  (d) Light sensor based switch
(3) EDL embedded AB 503Q. The EDL is configured with an embedded AB. The AB embedded/subsumed in the EDL compris a vibration sensors adept at sensing vibration energy in a frequency band corresponding to typical vibration due to an earthquake. The AB determines to have triggered when the vibration intensity is above a certain threshold and the EDL optionally takes some action (like put the EDL in 'Unlock' mode) and optionally sends the AB signal message (E.g. Seismic signal message) to the network via the EDL's wired or wireless data network link. A variant of such AB could be packaged as independent AB without locking and Ekey reading function of an EDL.
(4) Wireless remote switch AB 503R that has wireless communication capability to communicate with nearby Router 504 and also the ability to communicate with an EDL 501 via optical communication link 553, or wireless link 511. Activating the AB could send a communication message to the EDL, which in turn could take some action (E.g. lock down the lock, or remotely unlock the lock) and optionally send an AB Lockdown signal message to the network via the EDL's wireless link 511. In another embodiment the AB can also be optionally configured such that pressing the AB sends a message to wireless router 504. Some low-cost AB embodiments are unable to communicate with wireless router 504.
(5) Router hardwired AB 503 that is wired to a Router 504. Router 504 has IO capability to provide an electrical connection to the AB switch, LED, beeper etc. The router has a software application program that implements the needed AB functionality that comprise:
  (i) Detecting the time series changes of a sensor (E.g. switch) state (over a short period) and mapping them to a corresponding predefined signal (one amongst many predefined possible signals), and generating a message ("AB signal message") corresponding to the signal.
  (ii) For a given AB signal message, determining the required sequence of actions and executing them.
  (iii) Appropriately controlling the AB's feedback components (E.g. LED, beeper etc.).
  In an embodiment when the AB signal message is generated the Router sends the AB signal message to the network 506.
  In another embodiment when the AB signal message is generated the Router sends the AB signal message to the ASS 502 or Fail-over ASS 522.
  In another embodiment when the AB signal message is generated the Router sends the AB signal message to the AB-App 515.
  In another embodiment when the AB signal message is generated the Router autonomously performs a pre-configured sequence of actions. Non limiting examples of actions are:
    (i) Issue a lockdown command to a subset of EDLs that are in the router's downstream network (the downstream network comprises all ACS components (E.g. EDL, Routers, Ekey) for which the router provides upstream data connectivity, either directly or via downstream-located routers)
    (ii) Communicate with peer router to request the peer router to execute a command. E.g. Request to lock down a set of EDLs that may be in the peer router's downstream network
    (iii) Communicate with peer Routers requesting specific information.
    (iv) Compute a business logic function
    (v) Evaluate a logical operation and depending on its outcome execute one amongst many possible subsequent operations.
ii) Dumb ABs that don't have an intelligent controller in the housing of the AB and require an AB-App 515 to implement the AB functionality. They generally comprise a switch sensor and feedback device(s) (E.g. LED, beeper, haptic vibrator). A dumb AB is wired to another device that has digital communication capability and optionally computing capability (E.g. Computer, LAN Input-Output (IO) module 510, USB Input-Output module 510U, etc.). Non-limiting examples are:
(1) LAN-based AB 503D that is wired to a LAN IO module 510 to provide electrical connection to the AB switch, LED and beeper. The LAN IO module 510 communicates with another intelligent device (E.g. PAC 512) that is running an Action-Button application software program (AB-App) 515 that interacts with the ASS 502. The AB-App 515 implements the needed AB functionality, including getting the switch state from the LAN IO module 510, determining the required action, sending AB signal messages to the ASS 502, and receiving responses from the ASS to appropriately control (via LAN IO module) the AB's feedback components like LED and beeper.
(2) USB based AB 503U that is wired to a USB IO module 510U which is further connected to PAC 512. USB IO module 510U provides electrical connection to the AB switch 503U, LED, and beeper, etc. The Action-Button application software program (AB-App) 515 communicates with and controls the USB IO module 510U, and interacts with the ASS 502. The AB-App 515 implements the needed AB functionality, including getting the switch state from the USB IO module 510U, determining the required action, sending AB signal messages to the ASS 502 and receiving responses from the ASS to appropriately control (via LAN IO module) the AB's feedback components like LED and beeper. In another embodiment, instead of using a USB-based connection, one can employ other alternative methods (E.g. Data Acquisition System, Digital IO PCI card that plugs into computer motherboard, SPI or I2C bus based IO expanders etc.) to electrically connect with and control AB 503U.

b) Software based. Software-based ABs are those that abstract an Action Button in software. Some such ABs are displayed as a graphical widget on a GUI-based software application (that clones functionality of a hardware-based AB), while others may be autonomously running a software application (E.g. Video Analytics software) that do not require human feedback interface features (E.g. feedback or status LED indication etc). Non-limiting examples are:

(1) An embodiment of Soft Button 503S is an application software program running on PAC 512. It presents a GUI with graphical widgets corresponding to an Action Button with a method to activate it and a status LED/text display. When the user exercises (selects or double clicks) the Action Button graphical widget, the program 503S implements the needed AB functionality: Sending an AB signal message to the ASS 502 and receiving a response from the ASS to appropriately control the AB's feedback components like audio speaker and LED/text graphical widgets.

(2) An embodiment of Soft Button 503S is an application software program running on PAC 512. It allows a user to create a new AB and associate it to a collection of zones (See description of FIGS. 3, 6) corresponding to a pre-existing AB hardware (by allowing a user to select a specific hardware-based AB amongst all ABs in the system). This feature allows users like campus police and facilities executives to use a mobile PAC 512 and invoke the effect of pressing the AB to implement lockdown on a collection of EDLs corresponding to a physical AB. It presents a GUI with graphical widgets (corresponding to an AB signal or command message) and status LED/text. When the user exercises (selects or double clicks) the Action Button graphical widget the program 503S implements the needed AB functionality: Sending AB signal message to the ASS 502 and receiving a response from the ASS to appropriately control the AB's feedback components like audio speaker and LED/text graphical widgets.

(3) An embodiment of AB-AU 503A is a voice analytic software application fed by audio sensors that constantly monitor entry to vital doors (audio sensor that could be located in an EDL, video camera, or some other independent dedicated device). The software performs natural language transcription, detection of human voice expressing anger and/or threatening words/sentences, and recognizing specific sounds (like gun shots, glass breaking, door kicking etc). This software application can act as an Action Button and automatically generate a Lockdown signal message. In some embodiments it may feed other analytic software applications (E.g. AB-VA) or information integration software.

(4) An embodiment of AB-VA 503V is a video analytic software application fed by video and/or imaging sensor(s) (E.g. millimeter wave imaging sensor (MMWIS), sonar imaging sensor, etc.) that constantly monitor entry to vital doors, looking out for person with weapon (E.g. rifle, gun, knife etc) and/or an angry facial expression and/or demeanor. This software application can act as an Action Button and automatically generate a Lockdown signal message. In some embodiments the imaging sensor may feed another analytic software application that can identify hidden guns, bullets, bullet magazines, knifes etc). Face recognition software may be further used to exclude known good persons (E.g. armed policemen, first responders). Information fusion software may be further used to combine the real-time output of video analytics and imaging sensor analytics system to further decrease the uncertainty of identifying a potential Active Shooter and in turn trigger the generation of an AB alarm message.

(a) Information Integration (E.g. Sensor fusion, data fusion etc) may be further used to combine the real-time output of video analytics, imaging sensor analytics system and voice analytic software application to further increase the probability of identifying a potential Active Shooter, that in turn triggers generation of AB alarm message.

(b) The AB-VA 503V may be associated with AB-AU 503A to perform data fusion resulting in more sensitive and robust identification of threatening situations that could then be used to generate 'Lockdown' signal message.

Various kinds of AB 503 allow an operator to raise an alarm message in response to a threat or emergency. Action buttons can be alternatively configured to unlock a set of doors, or some other action by sending a different message.

In some embodiments, action buttons have to be pressed for a certain period of time, while in other embodiments, action buttons have to be pressed and released a certain number of times (within a specific time interval) in order to be activated (this could be to reduce the possibility of accidental/un-intentional operation). ABs may also have other pressing sequences to execute a self-test procedure, and yet another pressing sequence to generate a test action button communication with the ASS (to facilitate periodic full system test/certification)

While action buttons can be implemented as push-buttons, this invention is not limited to any implementation or activation procedure of action buttons. Non limiting examples:

a. The inner door handle of an EDL can act as an action button, with the requirement that it has to be pulled down and released a certain number of times to trigger.

b. Another form of action button can be a gesture sequence, like touching an EDL sensor or antenna in a particular sequence or particular way (E.g. touching with a finger versus touching with a palm, or move the palm within 2 inches without touching the sensor).

c. Some SecureALL EDLs have two antennas on the interior and two antennas on the exterior escutcheons of an EDL. In some embodiment these antennas are able to detect, locate the position of, and communicate with, a hands-free LR-Ekey (SecureALL's U-Key). These antennas are also used to communicate with the router 504. These antennas, located on the escutcheon surface, are multifunctional in that in addition to wireless communication, they can detect antenna detuning caused by putting a human hand in close proximity of the antenna (e.g. a hand within a few inches of the antenna). The degree of antenna detuning can be measured (E.g. as change in transmission line reflection S11 S-parameter). Thus, a hand gesture sequence on one or both antennas on the escutcheon can be a captured and decoded to match a given gesture. Each type of gesture could correspond to an AB code and a corresponding AB signal message. Thus one or more AB signal message(s) can be selected based on the recognized gesture. Other forms of gesture inputs can also be recognized, for example by continuously measuring:
  i. Capacitance change (similar principal as "Theremin" invented by Léon Theremin),
  ii. Ambient light intensity,
  iii. Light reflectivity
d. Another type of Action Button sensor could be camera-based 2D or 3D image processing, employing a gesture recognition system that can recognize distinct commands signals, each command signal mapping to a specific AB signal message. The camera could be turned on by another sensor (E.g. light sensor, mechanical switch, vibration sensor, microphone etc).
e. Another type of Action Button sensor input can be a voice command recognition system, which can recognize distinct command signals, each command signal mapping to a specific AB signal message.

In a preferred embodiment of the invention all data network links are encrypted.

In a preferred embodiment of the invention all ACS devices and computers (E.g. EDL, Ekey, Router, AB, ASS, PAC etc) that want to communicate to each other use secured end-to-end encryption using symmetric keys that are securely established using asymmetric cryptography (E.g. PKI/Public Key Infrastructure). This ensures that intervening network devices can't decrypt communication that is not meant for them or spoof the communication. In particular all operative messages, commands and event notifications are end-to-end encrypted.

A spare computer could act as a fail-over computer 514 to provide higher system availability by mitigating the risk of a single point of failure (due to any reason, e.g. failed server computer or software, software maintenance) of the SS computer that is running core-application 521 and PSSC. The fail-over computer 514 acts as a proxy to SS server 502.

The fail-over computer 514 runs a software component 522 that provides either a full feature replacement of the software running on SS 502, or another type of software that provides lesser but gracefully degraded functionality. The latter option allows easy and robust method to only provide the sub-set of functionality that demands high-availability. Lockdown is one such function that many customers demand to be highly-available, asking for protection against a single point of failure due to the server going down. In an another embodiment the Failover computer could run an application 538 that implements the functionality of LCD described later (FIG. 9, section: DISTRIBUTED REFLEX LOCKDOWN).

Figure 1B:
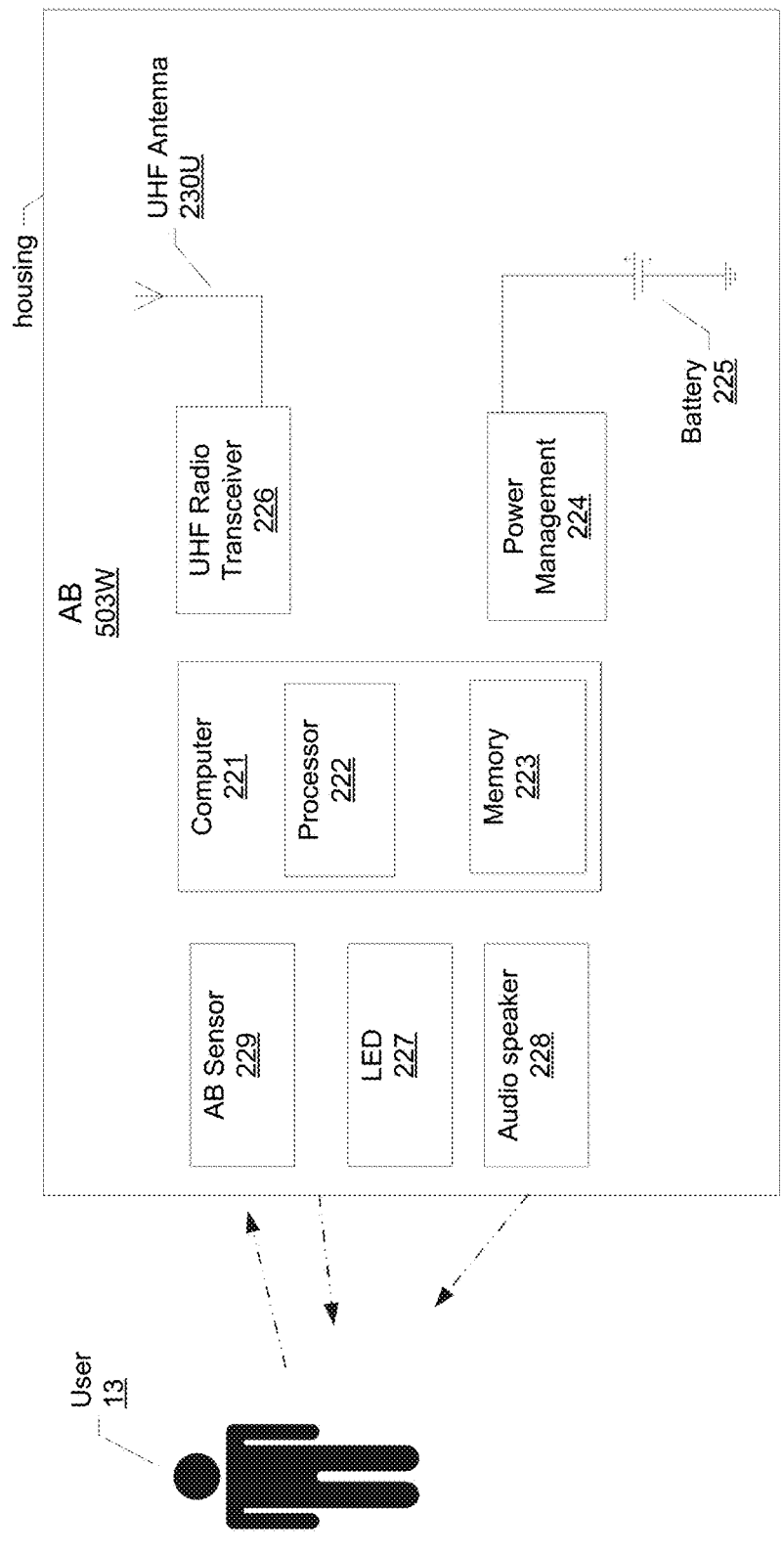
FIG. 1B shows an embodiment of the of a wireless Action Button the present disclosure.

FIG. 1B is a schematic illustration of one embodiment of a wireless Action Button AB 503W. It comprises a computer 221 which further comprises a processor 222 and memory 223 (that is used to store program as well as provide space for runtime program variables and data structures) and a wireless transceiver 226 connected to antenna 230U that allows wireless communication for example with router 504 (it is to be understood that the wireless transceiver could operate on any range of electromagnetic spectrum including optical or RF band (E.g. microwave, UHF, VHF etc) and operating power level to wirelessly communicate over desired distance). When the user 13 interacts with the AB Sensor 229, the computer 221 recognizes the time series change of the AB sensor 229 output as one amongst many predefined possible signals, and sends via the wireless transceiver 226 a corresponding signal message. The computer 221 can also receive a command message via the wireless transceiver 226, whereby it interprets the command and performs needed action. The computer 221 controls the LED 227 and audio speaker 228 to provide feedback to the User 13. The AB 503W operates using the power available from battery 225, although one can alternatively use other power sources like mains AC power or an energy harvester. Power management 224 converts the available power from battery 225 to an operating voltage suitable to operate various electronic circuit in the AB 503W.

Figure 1C:
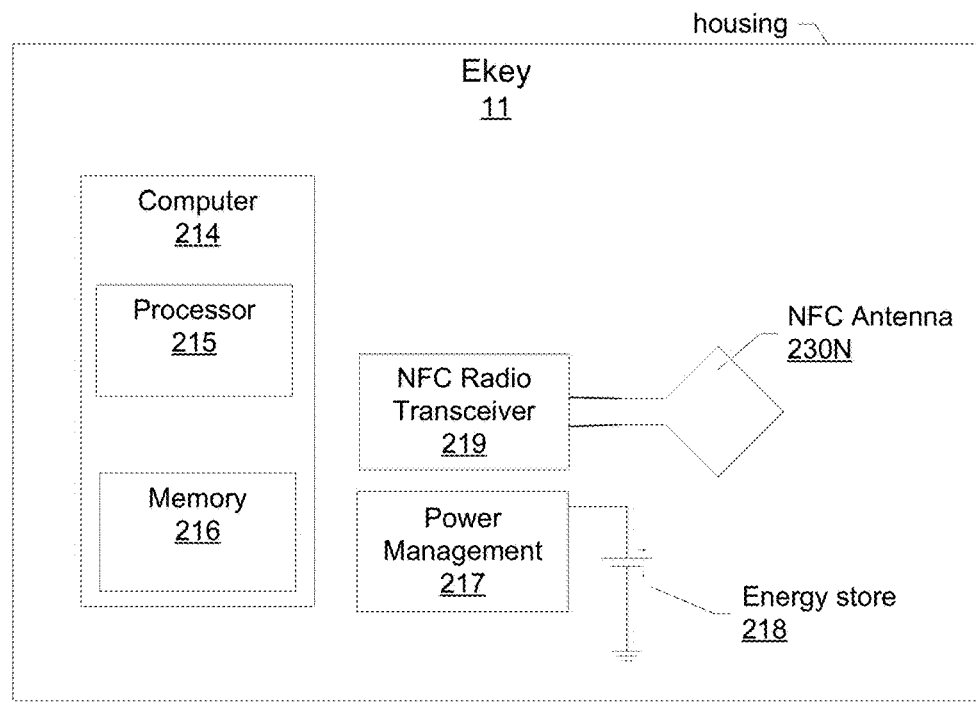
FIG. 1C shows an embodiment of an Ekey of the present disclosure.

FIG. 1C is a schematic illustration of one embodiment of an electronic key Ekey 11. It comprises a computer 214 which further comprises a processor 215 and memory 216 (that is used to store program as well as provide space for runtime program variables and data structures. In some embodiment Ekey's "Lockdown level" is stored in the Ekey's memory 216). It further comprises a means to communicate with an EDL (some embodiments use wired galvanic contact or magnetic tape strip that is read by a magnetic reader head on the EDL when the tape is swiped on it) using inductive coupling (E.g. a proximity cards, contactless smart cards, ISO 1444, 15693 cards, NFC). When the Ekey 11 is placed close to an EDL equipped with a compatible wireless NFC radio transceiver, the computer 214 is able to communicate with the EDL's computer. Various types of cryptographic techniques could be used to secure information exchange and/or authenticate each other. A communication protocol is used to identify and authenticate each other and evaluate rules (Access Control rules) related to Ekey's access permissions for the EDL (at that moment of time), as a result of which the EDL unlocks if the Access Control rules passes. It is to be understood for the access control to work the Ekey's access permissions could be stored on the EDL or on the Ekey. In some embodiments the computer 214 can also receive command messages via the wireless transceiver 219, whereby it authenticates, interprets the command and performs the needed action. The Ekey 11 operates using the power available from energy store 218. In some embodiments the energy store is a battery; in others a capacitor stores energy harvested from a reader provided oscillating magnetic field. Power management unit 217 converts the available power to an operating voltage suitable to operate various electronic circuits in the Ekey 11.

Figure 1D:
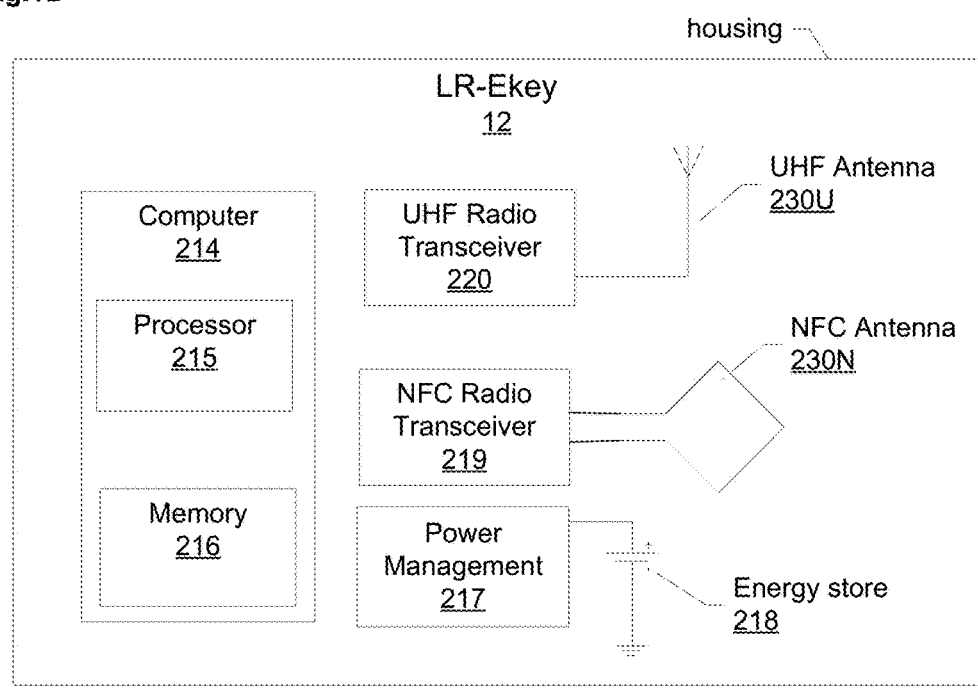
FIG. 1D shows an embodiment of an ER-Ekey of the present disclosure.

FIG. 1D is a schematic illustration of one embodiment of an electronic key operable at longer range LR-Ekey 12. It is similar to Ekey 11 (see similar numbered blocks) except for the following main differences:
  a. It uses a far-field RF communication using a UHF radio transceiver 220 (E.g. BLE, Zigbee) connected to antenna 230U. It is to be understood that the wireless transceiver could operate on any range of electromagnetic spectrum including optical or RF band (E.g. microwave, UHF, VHF etc) and at an operating power level to wirelessly communicate over the desired range of 1-100 meters. This allows:
    i. an LR-Ekey 12 to communicate with an EDL at long distance (compared to Ekey 11 that is limited to a few inches), and could enable hands-free operation such that when the LR-Key is in the user's pocket and say 3 meter away from the EDL, the EDL could authenticate the LR-Ekey 12 and unlock the door (I.e. Hands free; not requiring the user to touch the LR-Ekey by hand to remove it from the pocket and present it close to the EDL).

ii. long distance communication with router 504 allowing communication with ASS 502. Thus the ASS could change information on the LR-Ekey 12, as well as get status and event information from LR-Ekey 12.

b. The far-field RF communication using a UHF radio transceiver 220 consumes a very significant amount of power (that typically can't be supported by energy harvesting of magnetic field scheme used by Ekey 11) thus the energy store 218 has to be a battery. The higher energy available from the battery allows LR-Ekey 12 to use more energy intensive cryptographic operations that are more robust.

c. In an embodiment LR-Ekey 12 could use NFC Radio transceiver 219 to communicate with EDL 501, as in the case with Ekey 11, however UHF Radio transceiver 220 is used for long distance communication with router 504 allowing communication with ASS 502. Thus the ASS could change information on the LR-Ekey 12, as well as get status and event information from LR-Ekey 12.

Figure 1E:
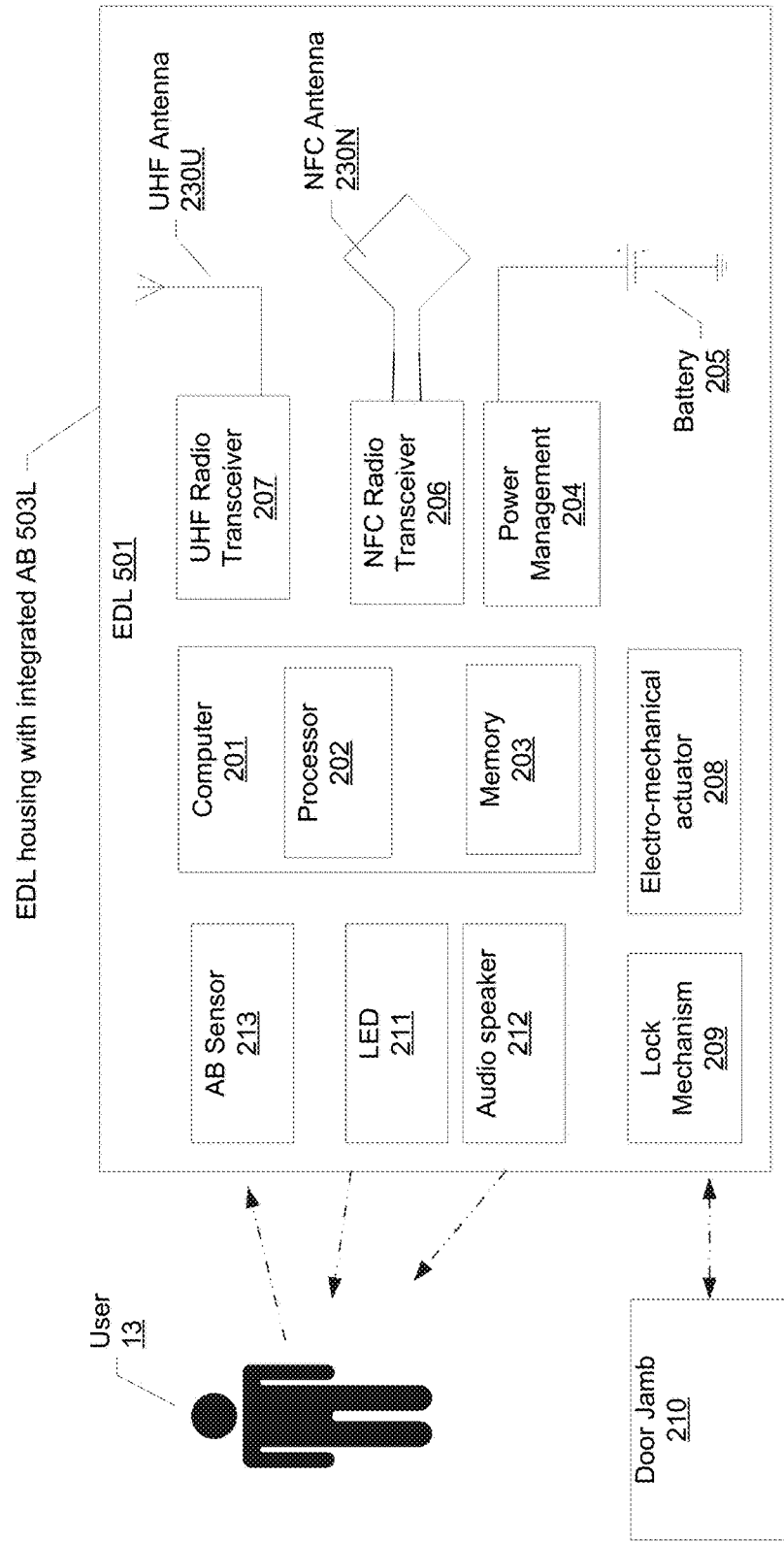
FIG. 1E shows an embodiment of the EDL of the present disclosure.

FIG. 1E is a schematic illustration of one embodiment of an EDL 501 with an integrated AB 503L. It comprises a computer 201 which further comprises a processor 202 and memory 203 (that is used to store program as well as provide space for runtime program variables and data structures) and an AB sensor 213 which can take user input and forward it to processor 202 to implement Action Button functionality. The EDL further comprises a wireless transceiver 207 that allows wireless communication for example with router 504 (it is to be understood that the wireless transceiver could operate on any range of electromagnetic spectrum including optical or RF band (E.g. microwave, UHF, VHF etc) and operating power level to wirelessly communicate over desired distance).

The computer 201 uses the wireless transceiver 207 to send messages (to router 504, or to ASS via router 504). The computer 201 can also receive command messages via the wireless transceiver 207, whereby it authenticates and decrypts the communication, interprets the command and performs the needed action. The computer 201 controls the LED 211 and audio speaker 212 to provide status information or feedback to the User 13. The EDL 501 operates using the power available from battery 205, although one can alternatively use other power sources like mains AC power or an energy harvester. Power management 204 converts the available power from battery 205 to operating voltage suitable to operate various electronics circuit in the EDL 501. The EDL further includes an electro-mechanical actuator 208 that is controlled by the processor and can put a lock mechanism 209 into locked or unlocked mode. The lock mechanism, when it is in a locked state, secures the lock to the door jamb 210 to prevent the door from opening.

The EDL 501 communicates to Ekey 11 (or a subclass of EKey like LR-Ekey 12, or UKey) using a transceiver (207, 206) that is compatible with Ekeys. In an embodiment it has NFC Radio transceiver 206 to allow it to communicate with and read NFC-based Ekeys, as well as UHF radio transceiver 207 to allow it to communicate with and read BLE (Bluetooth Low Energy) based LR-Ekey 12. Various types of cryptographic techniques (E.g. PKI and AES) are used to secure information exchange and/or authenticate each other. A communication protocol is used to identify and authenticate each other and evaluate rules (Access Control rules) related to Ekey's access permissions for the EDL (at that moment of time), as a result of which the EDL unlocks if the Access Control rules passes. It is to be understood for the access control to work the Ekey's access permissions could be stored on the EDL or on the Ekey.

In some embodiment Ekey's "Lockdown level" is stored in the EDL's 501 memory 223, while in other embodiment it is stored in Ekey's 11 memory 216.

Figure 2:
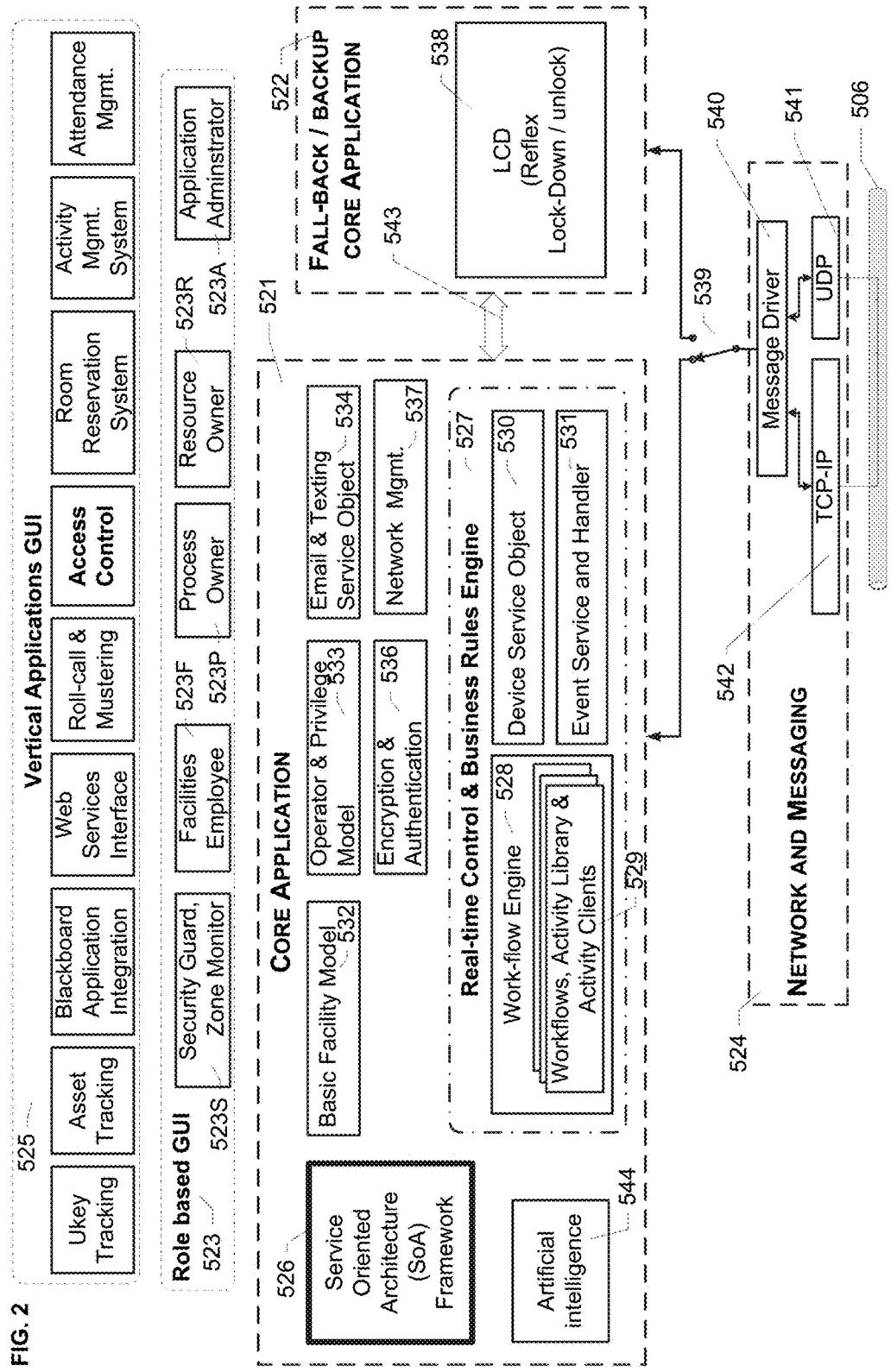
FIG. 2 shows an embodiment of the Application Software Server of the present disclosure.

FIG. 2 shows the detailed software architecture of an embodiment of the ASS 502 system. The system comprises various exemplary components that are aggregated in groups for easier understanding. It should be recognized that the software components could be distributed differently without deviating from the teachings of this disclosure. Many of these software components could run in a distributed environment across multiple computers. The system comprises:

a. Core Application 521 b. Network and Messaging function 524 c. PAC interface & support software components needed to support all application running on PAC 512 (I.e. GUI Application 505, Vertical applications 525, AB-app 515, Soft button 503S).

Core Application 521 is a group of software components that are generally important software components or services to realize a functional system. It comprises:

a. SoA Framework 526 that provides an efficient and reusable framework foundation. An exemplary framework could be built on top of JBoss enterprise application platform.

b. Another sub-group of software components called "Real-time Control & Business Rules Engine" 527, that has software components to implement:

i. DSO (Device Service Object) 530, that provides connectivity to devices and presents itself as a high level, abstracted proxy to an actual physical device (e.g. physical device EDL, Router, AB, Ekey). The high level abstraction implements business logic to handle requests from other software components/modules located in the ASS or external to the ASS. It exposes methods that provide access to its attributes or operative commands that result in sending command message(s) to the actual device. Events received from the device are handled per business logic that could also result in posting a logical event to the Event Service and Handler 531 and/or invoking methods on other software components/service.

ii. Event Service and Handler 531, which provides an event subscription and notification service. Events comprise an Event-ID and a set of optional arguments that carry additional information about the event. It also provides software-configurable invocation of event handing method(s) when certain event messages are received with argument values as per a defined logical relationship (e.g. low battery event comes with the arguments: battery voltage, battery internal resistance, etc). Amongst others, the Event Service and Handler could also invoke:

1. An email

2. A remote method on a software component/service.

3. A workflow iii. A collection of workflow application components comprising:

1. Workflow Engine 528 that executes submitted Workflow Processes with associated process-parameters. It is a software component code that implements the decision making. It could be realized in various ways, including, as a software program, a program written in a software scripting language, late binding programming code, a Workflow software engine, software library, etc. The open-source jBPM (Java Business Process Model) and Linux shell are non-limiting example of the Workflow engine 528.

2. A workflow could comprise a set of activities with interrelationships necessary to implement a sequence of actions. Activities have specific code and configuration to implement business rules. It could be realized in various ways, including, as a software program, a program written in software scripting language, late binding programming code, software library, etc.

3. An activity library is a readymade set of pre-defined activities that can be strung together (used) in a workflow to implement a desired control flow. It could be realized in various ways, including, as a software program, a program written in software scripting language, late binding programming code, software library, etc.

4. An activity is a business activity that accesses a set of process attributes as input/output arguments. When the activity is invoked, it executes a code program that can use local classes and/or invoke remote methods on external classes, services or service objects (E.g. Java beans). It could be realized in various ways, including, as a class interface, a software program, a program written in a software scripting language, late binding programming code, software library, etc.

The workflow may be triggered by specific event messages generated by the other components of the ACS 10. Non limiting examples include EDLs, Action-buttons (AB 503), Routers, Ekeys or software generated event messages, in addition to user requests via GUI-Application 505. When the ASS receives an AB signal message it can trigger a workflow. A workflow 529 is a user definable sequence of activities that need to be performed in response to the event that triggered the workflow. Activities in a workflow may require operator interaction (for example: the operator has to file an incident report, or choose an option (via use of GUI) or they may be automated tasks performed by the server (for example: send email or text message notification). It should be understood that without using a workflow (using a workflow engine), an equivalent sequence of activities can be implemented by various other methods like:

i. Hard-coded software function,
ii. Software function that has configurability to address a broad range of user operation sequence logic (non-limiting examples: activity clients of Workflow, functions with overloading),
iii. End-user (customer) provided software methods, software classes, software components, or software services.

c. Basic Facility Model 532 is a data model that describes the physical layout of a facility. It describes campuses, buildings, floors, rooms, doors and EDLs mounted on the respective door, etc.

d. Operator & Privilege Model 533 describes how users are defined is an organization, including their privileges to use GUI applications, Ekey access privilege, etc.).

e. Email and text message interface is provided by 534.
f. Encryption and authentication between various communication entities, devices and operators is provided by 536.
g. Network connection monitoring and control is provided by 537.

GUI based access to various classes of operators is provided by Role based GUI 523. Roles define a collection of GUI actions that an operator has privileges to use; it prevents an operator from using other capabilities of the operator interface. Typical set of roles are Security Guard Zone monitor 523S, Facilities Employee 523F, Process Owner 523P, Resource owner 523R and Applications administrator 523A.

Distinct software functions and features of the system are collated as various vertical applications 525. Each vertical application is packaged as a collection of various functionalities that the system provides. Each functionality is delivered by a set of software modules that use:

a. Accessing core application 521,
b. A set of role based GUIs
c. Additional software modules for the vertical applications.

The vertical application could comprise a set of functionality that could overlap other vertical applications. As is known in the prior art the vertical application software could be running on the SS computer 513 with a thin-client (E.g. web browser, android app) or a thick-client GUI application 505 running on the operator's PAC computer 512. A common vertical software application is the Access Control software application (ACSA) that provides controlled access to door locks on scheduled or ad-hoc basis to users carrying their designated Ekey.

Network and Messaging function layer 524 provides network data connectivity to ACS devices (E.g. EDL, Router, AB, Ekey). It could run on a dedicated computer or on a shared computer that also runs other software applications. It comprises:

a. Low level communication drivers for connection oriented 542 (E.g. TCP-IP) and packet oriented 541 (E.g. UDP) data transport networks.
b. Message Driver 540 that manages device connections and implements buffering, flow control, communication link state, serialization, re-connection, etc.

This light weight Network and Messaging function layer 524 can switch the uplink connection between Core Application 521 and Fall-back (backup) core-application 522 via a software switch 539.

Lockdown

An EDL could be configured to allow access to a set of Ekeys S in 'Normal' state, and to a set of Ekeys T in 'Lockdown' state where set T is a subset of S (I.e. T⊆S). SecureALL Corporation has an Access Control System with remote lockdown capability such that when a user puts an EDL in lockdown by pressing the AB on the EDL in a certain specific way (E.g. presses the AB three times within 5 seconds) to signal lockdown, the EDL changes its operating mode from 'Normal' to lockdown'. In 'Normal' mode the EDL allows access when a user manipulates an Ekey on the EDL where the Ekey is an element of set S (I.e. $\{x|x \in S\}$), while in 'Lockdown' mode the EDL allows access to only those Ekeys that are members of set T (I.e. $\{x|x \in T\}$). In a preferred embodiment T ⊂ S (T is a proper subset of S) as it is simpler to implement and provides a more systematic way to configure the EDL's Ekey access permissions. Ekeys of set T can be given, for example, to a very small group of trained and trustworthy first responders (E.g. Police). When anybody puts the EDL in 'Lockdown' mode the EDL ignores any built-in schedule that keeps the EDL in an unlocked/open state (e.g. any mode that allows access to visitors that do not have an Ekey) or allows access to a set of Ekeys, possibly depending on the time and date. (Non-limiting example: In 'Office' mode of operation the EDL stays in an unlocked state without requiring an Ekey; thus visitors can enter the door, say, during guest hours, without an Ekey. At other hours the EDL goes into 'Normal' mode whereby it would unlock only when a person manipulates on the EDL with an Ekey which is an element of set S. Different sets S may be defined to correspond to different times and dates. For example, a first set S can be defined for Fridays, and a different set S for Mondays.). This type of EDL lockdown capability gives immediate protection to a person who sees an active shooter nearby and secures herself in a room by putting the EDL(s) of the room into 'Lockdown' mode, in which the EDL(s) prevents anyone (but the first responders with a first responders' Ekeys) from entering the room to harm her. This is because the active shooter is unlikely to have in his possession an Ekey that is a member of set T; even if he obtains by force an Ekey from an innocent bystander, the bystander is unlikely to be a first responder, and the bystander's Ekey will not grant access through the EDL that is in 'Lockdown' state. (This is sometimes referred to as 'Local Lockdown' (LLD) as the Lockdown initiating person physically interacts with the EDL to put it into 'Lockdown' mode.)

An EDL optionally gives a visual and/or audible indication to indicate that the EDL is entering the 'Lockdown' mode; in some cases the indication continues for as long as the EDL is in 'Lockdown' mode. The EDL also sends a message to the ASS when the EDL transitions into and out of 'Lockdown' mode. Further, the ASS could be configured to send out emails to (a priori) designated addresses with necessary details about the lockdown occurrence. The GUI Application 505 on PAC 512 prominently notifies (visually and/or audibly) to the operator of the occurrence of one or more EDLs going into 'Lockdown' mode.

In an embodiment when an EDL is in 'Lockdown' mode, and the user presses the AB on the EDL in a specific way (E.g. button kept pressed for 5 seconds) to signal a request to remove the lockdown condition, the EDL changes its operating mode from 'Lockdown' to 'Normal' (or in some embodiments from 'Lockdown' mode to the mode it was in immediately before 'Lockdown' was issued).
  a. This method could also be used to change the operating mode to a different mode.

The LLD function could be misused as a prank play in some applications (E.g. elementary school) where children could manipulate the Lock's AB 503L to put the EDL in 'Lockdown' mode. In an embodiment of this invention the EDL is configured such that it will accept its AB 503L input only if an Ekey with access permission to the EDL has been read preferably within a configured period of time (timeout period). E.g. if an Ekey has access permission to the EDL, and the EDL reads the Ekey, the EDL allows the use of the AB for the next 20 seconds to put the EDL into 'Lockdown' mode. In some embodiments, the EDL supports reading and authenticating access to the Ekeys for the lockdown purposes (allowing the use of AB 503L) if the Ekey is outside the room but not if the Ekey is inside, or if the Ekey is inside but not if the Ekey is outside, or regardless of the Ekey position. Recognizing only the Ekeys located inside for putting the EDL in 'Lockdown' mode facilitates enabling only the authorized users to initiate the Lockdown mode, as unauthorized users are less likely to be inside. Further, regardless of whether the Ekeys are recognized outside, recognizing the Ekeys inside protects the users located inside from having to open the door and become exposed to an active shooter to initiate the Lockdown, as would be the case if only the Ekeys located outside were recognized. In another embodiment an EDL that supports LR-Ekeys provides more enhanced capabilities whereby the EDL will allow the use of AB 503L only as long as the EDL to LR-Ekey RF communication path loss (which is related to distance between the EDL and the LR-Ekey) is less than a configured threshold (meaning as long as the Ekey is within a programmed distance of the EDL. E.g. 4 ft.). The EDL estimates the RF communication path loss as measured by the EDL and/or the LR-Ekey by
  a. communicating with the LR-Ekey and exchanging information about their transmitted power and transmitter antenna gain and/or
  b. knowing their own receiving antenna gain and the RSSI (received signal strength indicator) and/or
  c. Using the RF free space path loss equation.

In an embodiment of this invention the EDL is configured such that it will accept its AB 503L input to change operating mode to 'Lockdown' only if an Ekey that has permission to put EDL into lockdown mode has been recently read (E.g. Ekey read within last 10 seconds). In another embodiment of this invention the EDL is configured such that it will accept its AB 503L input to change its operating mode from 'Lockdown' to another mode, only if an Ekey that has permission to put EDL out of lockdown mode has been recently read (E.g. Ekey read within last 10 seconds). This is useful in situations where a teacher's Ekey is required to put a EDL into 'Lockdown' mode while her students can't put EDL into 'Lockdown' mode, and if the EDL is put into 'Lockdown' mode, only first responder's Ekey can put the EDL back into 'Normal' mode of operation. Often there is a requirement that people who have access to the EDL should also have capability to put the EDL into 'Lockdown' mode. So in an embodiment the EDL is configured such that the set of authorized users' Ekeys that are permitted to change EDL's operating mode to Lockdown mode is same as the set of Ekeys that have access permission to unlock the EDL when the EDL is in 'Normal' mode of operation.

In an embodiment of this invention the EDL is configured such that it will accept a 'Lockdown' signal message from AB 503R only if an Ekey with access permission to the EDL has been read within a configured period of time (timeout period) or EDL to LR-Ekey RF communication path loss (which is related to distance between the EDL and the LR-Ekey) is less than a configured threshold (indicating the teacher is close by to the EDL). This limits misuse of this functionality by miscreants after the user who unlocked the EDL with her Ekey had left the scene.

In another embodiment the Ekey may be packaged with AB 503R functionality with common electronics to implement both the Ekey & AB 503R functions.

In another embodiment the Ekey's ability to put an EDL into LLD may be constrained by a schedule (E.g. days of week and start-end time). The schedule may be downloaded by the ASS to the EDL and/or Ekey. This allows separation of scheduled access to the EDL (and ACS function) and the ability to perform LLD.

In another embodiment the Ekey's ability to put an EDL into LLD may be on lease that has an expiration date & time. The ASS may periodically extend the lease. This prevents the possibility of misuse of the Ekey when it is lost.

It is understood that in some embodiments the ASS and an Ekey (E.g. LR-Ekey like UKey) can communicate with each other via router 504, or via EDL 501 (which in turn may use a router to connect to the ASS).

In another embodiment, when an EDL is put into LLD the EDL sends a 'Lockdown' signal message to the ASS and the ASS may be configured to communicate with a camera system to steer a specific camera towards the EDL and/or the space near the EDL and then send a communication to the system operator (E.g. GUI or email notification that may optionally have a link that allows the recipient to quickly access a camera's video stream).

Remote Lockdown:

If there is an active shooter on the prowl in a facility, an ACS operator (E.g. security staff, campus police) using the GUI Application 505 can remotely lock down a set of EDLs. The operator uses GUI Application 505 to select a set of EDLs and issues a lockdown command. The GUI Application communicates with the ASS, which in turn communicates with the respective EDLs (via the data network) sending 'Lockdown' command messages. This is sometimes referred to as 'Remote Lockdown' (RLD) as the initiating person could be far away from the EDL on which the 'Lockdown' is being performed. In a preferred embodiment each communication link is individually encrypted and the command message is end-to-end encrypted such that intervening nodes of the data network can't decrypt, modify or spoof it.

In an embodiment the GUI Application that has a secure communication link with the ASS, communicates with the ASS requesting to put a set of EDLs into 'Lockdown' mode; the ASS in turn communicates with respective EDLs (via the data network), sending a 'Lockdown' command message to the set of EDLs.

Some prior art ACS have provided capability to lock down a set of EDLs using an AB. They typically used dumb AB 503D that are wired to the ASS 502.

In an embodiment of the present disclosure an EDL's has many modes of operation and 'Lockdown' mode is graded by many levels. An exemplary system would be such that:
a. In 'Office' mode of operation the EDL stays in an unlocked state when Lockdown is not in effect
b. In normal mode (I.e. when Lockdown is not in effect) the EDL grants access to Ekey set T0 with set element count of M
c. In Lockdown level L1 the EDL grants access to Ekey set T1 with set element count of N
d. In Lockdown level L2 the EDL grants access to Ekey set T2 with set element count of O1
e. In Lockdown level L3 the EDL grants access to Ekey set T3 with set element count of P
f. In Lockdown level L4 the EDL grants access to Ekey set T4 with set element count of Q
where S is the set of all Ekeys in the ACS.
This allows various Lockdown levels to have a corresponding set of Ekeys that have permission to enter the door via the EDL. For example plumber's Ekey would allow access into a flooded room's EDL that in Lockdown Lockdown level L3 (corresponding to flooding issues), while in normal EDL operating mode plumber Ekey will not have access to the EDL.

In another embodiment where Q<P<O1<N<M

This allows various grades of dangerous conditions to be easily handled by progressively limiting access to smaller set of Ekeys when the EDL is in a higher grade of lockdown.

In a narrower embodiment of the above method an EDL has many modes of operation and 'Lockdown' mode could be graded by many levels. An exemplary system would be such that:

a. In 'Office' mode of operation the EDL stays in an unlocked state when Lockdown is not in effect
b. In normal mode (I.e. when Lockdown is not in effect) the EDL grants access to Ekey set T0 where T0⊆S
c. In Lockdown level L1 the EDL grants access to Ekey set T1 where T1⊆T0
d. In Lockdown level L2 the EDL grants access to Ekey set T2 where T2⊆T1
e. In Lockdown level L3 the EDL grants access to Ekey set T3 where T3⊆T2
f. In Lockdown level L4 the EDL grants access to Ekey set T4 where T4⊆T3

This allows various grades of dangerous conditions to be more easily managed and handled by progressively limiting access to a respective subset of Ekeys when the EDL is in a higher grade of lockdown. This is generally simpler to implement and provides a more systematic way to configure the EDL's Ekey access permissions. For example, a class room is accidently flooded and EDL(s) that allow access to the room are put in Lockdown level L3 mode, where the (EDLs) have a total of 4 levels of lockdown gradation. In level 3, the EDLs refuse entry to a professor's Ekey who is a member of set T0 but is not member of set T3 or T4 (as there could be electrocution risk in flooded room), while the facility's plumber's Ekey that is member of set T3 will allow entry to the door lock.

In another preferred embodiment the Lockdown command message to the EDL carries optional arguments such as Lockdown level, duration of the Lockdown, absolute (UTC time) time for expiry of the Lockdown.

In another preferred embodiment the EDL will accept an Unlock command message and, in response, will keep the EDL in 'Open' mode (also known as 'Unlock' mode) whereby the EDL's ability to control entry into room is inoperative (this is unlike 'Normal' mode, that requires Ekey to unlock it and EDL stays unlocked only for a short period thereafter). The Unlock command could carry optional arguments such as duration of the unlock, absolute (e.g. UTC time) time for expiry of the Unlock command.

When the EDL is in 'Lockdown' mode or 'Normal' mode or 'Open' mode it would accept and operate on a subsequent:
a. Lockdown command message; the new command would supersede the effect of previous command.
b. Normal mode command message that switches the EDL to 'Normal' mode; the new command would supersede the effect of previous command.
c. Open mode command message that switches the EDL to 'Open' mode; the new command would supersede the effect of previous command.

Figure 3:
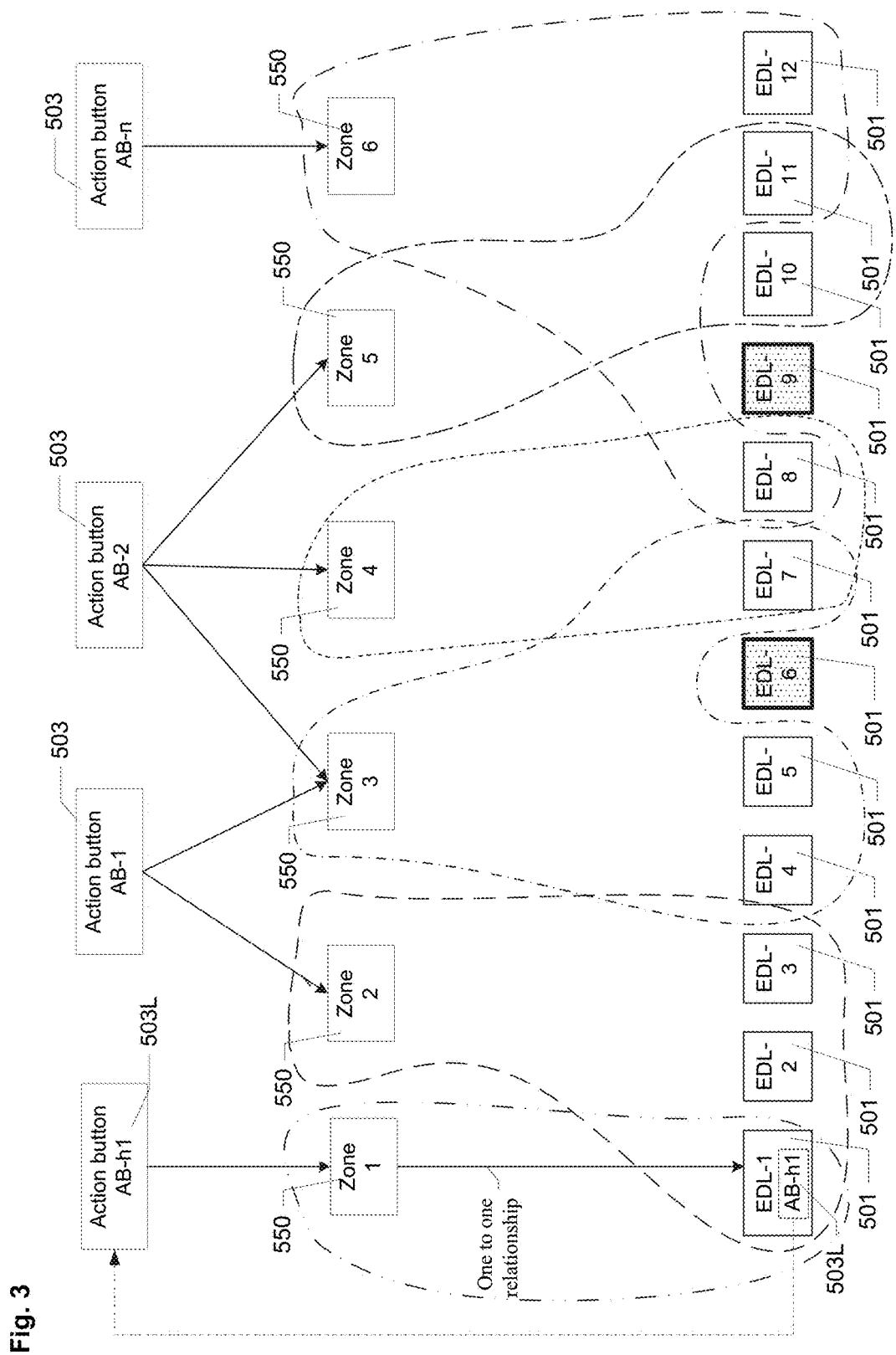
FIG. 3 shows relationship between Zone, Action Button and EDL of the present disclosure.

FIG. 3 shows the relationship between Action Buttons' Lockdown signal messages, Zones and EDLs.
a. A Zone 550 (also alternatively known as Action Area) is a user defined collection of EDLs. EDL 501 could be a member of zero or more zones.
b. ABs may be associated with zero or more zones, with the intent that when an AB generates a Lockdown signal message, all EDLs in the associated zones should be put in 'Lockdown' mode.
c. Some types of EDLs may have one or more integrated AB 503L whose associated Zone's scope is its host EDL. (E.g. EDL-1, AB-h11). When AB 503L generates a Lockdown signal message the EDL puts itself into "Lockdown" mode.

In an embodiment of the present invention the ASS is configured such that an AB's Lockdown signal message is mapped to a Zone (i.e. mapped to put all EDLs in the Zone into "Lockdown" mode). The ASS is further configured such that when it receives a Lockdown signal message from an AB, it communicates with all EDLs of the Zone (via the data network) sending 'Lockdown' command messages. After sending the messages the ASS provides a status update to the AB (that was the source of the Lockdown signal message) so that the AB can optionally provide a feedback signal to the user in the form of visual information (E.g. LED indication, text), audible information (E.g. beep, voice annunciation) or haptic (tactile) response. This tells the users that the Lockdown is in progress. In another embodiment, after the ASS has received the delivery confirmation of 'Lockdown' command messages from all EDLs it provides a status update to the AB (that was the source of the Lockdown signal message) so that the AB can optionally provide a feedback signal to the user in the form of visual information, audible information or haptic response, indicating that all the connected EDLs that are part of the Zone are in 'Lockdown' mode.

In another embodiment the ASS, EDL and AB are configured for 'Verification Testing' that allows customer to periodically verify proper lockdown operation (without disturbing user's normal use of the EDL). The ASS is configured to temporarily operate in a special test mode such that when it receives a Lockdown signal message from an AB, it sends a 'Lockdown Test' command message to all EDLs of the Zone (via the data network), the EDL processes the message identical to 'Lockdown' command message (i.e. simulating the 'Lockdown' mode and sending a response back to the ASS indicating successful execution of the command) except that the EDL does not change the operating mode to 'Lockdown' (i.e. simulating the 'Lockdown' mode). After sending the messages the ASS provides a status update to the AB (that was the source of the Lockdown signal message) so that the AB can optionally provide a feedback signal to the user in the form of visual, audible or haptic feedback. Similarly, after the ASS has received delivery confirmation of the 'Lockdown Test' command message from all EDLs it provides a status update to the AB (that was the source of the Lockdown signal message) so that the AB can optionally provide a feedback signal to the user in the form of visual, audible or haptic feedback indicating that all the connected EDLs that are part of the Zone processed the "Lockdown Test" command message. This scenario works similarly when the ASS is configured to temporarily operate in a special test mode and the operator uses GUI Application 505 to remotely lock down a set of EDLs.

In another embodiment the AB has an additional sensor input that is designed so that it can be engaged with conscientious effort that puts the AB into "Lockdown test" mode and causes the AB to send a "Lockdown test" signal message to the ASS; in addition the AB optionally provides a feedback signal to the user in the form of visual, audible or haptic feedback that it is in "Lockdown test" mode. Upon receiving a "Lockdown test signal message" from an AB the ASS sends a 'Lockdown Test' command message to all EDLs of the Zones corresponding to the AB (via the data network). An EDL processes the message identical to a 'Lockdown' command message (i.e. simulating the 'Lockdown' mode and sending a response back to the ASS indicating successful execution of the command) except that it does not change the operating mode to 'Lockdown' (i.e. simulating the 'Lockdown' mode). After sending the messages to EDLs the ASS provides a status update to the AB (that was the source of the Lockdown signal message) so that the AB can optionally provide a feedback signal to the user in the form of visual, audible or haptic feedback. Similarly after the ASS has received delivery confirmations of 'Lockdown Test' command messages from all EDLs it provides a status update to the AB (that was the source of the Lockdown signal message) so that the AB can optionally provide a feedback signal to the user in the form of visual, audible or haptic feedback indicating that all the connected EDLs that are part of the Zone have processed the "Lockdown Test" command message.

In another embodiment the ASS periodically communicates (E.g. every 90 seconds) with all ABs to make sure the AB communication links are healthy and operational. The ASS is configured to generate an alarm (for display on GUI Application 505 and/or email notification) if it finds that an AB communication link is down beyond a configured amount of time. In another embodiment the AB is configured such that if it senses that a communication link is down beyond a configured amount of time, it generates a visual, audible or haptic response indicating that the AB is not useable.

In an embodiment an AB has a seismic sensor, such that when earthquake stronger than certain magnitude occurs the AB generates a seismic signal message to the system to unlock a set of EDLs, allowing trapped people to rapidly egress the building via doors that normally require an Ekey with access permission, while allowing rescue workers easier access.

In an embodiment, devices such as ABs and/or EDLs (E.g. AB 503Q imbedded in EDL) include vibration sensors and report vibration events to the server. In the event that the server software application receives reports with an intensity above a certain threshold from a large enough number of devices indicating earthquake (e.g. a number larger than a predefined value), the server can issue a command to a set of EDLs and configure them to be in open mode or unlocked state for a configured duration.

Reflex Lockdown

Of the many disadvantages of prior art lockdown solution are:
  a. The big time delay in the chain of events from the time an Active Shooter is detected by an ordinary citizen to the time an ACS operator uses the GUI Application (running on the PAC 512) and the ASS sends lockdown command messages to EDLs in the affected building or area. The sequence typically involves:
     i. An ordinary citizen seeing the Active Shooter and/or hearing the consequence of his actions
     ii. The ordinary citizen running away and/or hiding from the Active Shooter
     iii. The ordinary citizen finding a way to contact campus safety or police
     iv. Campus safety or police making a determination whether it is an Active Shooter situation and whether it requires lockdown of a certain set of doors, buildings or the whole campus.
     v. Communicating with and commanding the ACS operator to issue a 'Lockdown' command message to desired set of EDLs.
     vi. An ACS operator accessing the ACS GUI Application 505, selecting the affected door locks and issuing RLD (remote lockdown) command messages to the set of doors locks.
  b. An ordinary citizen can protect herself in a room by putting the room's door locks into 'Lockdown' mode. While some EDLs can send a message to the ASS indicating it has gone into lockdown, one needs an active and not-busy operator in the control room (if indeed there is a 24×7 operational control room in the campus) who is monitoring the GUI Application 505 to see that a door has gone into lockdown. One can envision that at that time many distressed phone calls from potential victims are flooding the telephone line and demanding attention, which easily distracts the operator's focus from monitoring the GUI Application 505 to see that a door has gone into lockdown.

Clearly the longest pole in the tent is the communication to campus safety/police and the ACS operator with a wide range of possible time delay.

An embodiment of the present invention is automatic 'Reflex Lockdown', whereby ASS is configured to require the receipt of two or more 'Lockdown' signal message from ABs within temporal and/or spatial proximity resulting in an automatic recognition of an Active Shooter scenario and triggering an Active Shooter workflow. It is to be understood that this capability could also be used to perform other automatic actions like a. unlocking doors when many seismic sensors detect strong seismic motion
b. unlocking doors when many AB sensors detect increase in temperature consistent with fire.

In a non-limiting example of 'Reflex Lockdown', the ASS, upon receipt of at least two lockdown signal messages from separate Door ABs 503L located in a building within 5 minutes, may be configured to send lockdown command messages to all EDLs in a building or collection of EDLs (referred to as Zone) and alert security personnel (via a GUI Application, text, email, automated telephone call, invocation of applications like the "Pager duty" Alert management and notification system). When a Zone is in Reflex Lockdown, if the ASS additionally receives another AB lockdown signal message from a second building, the ASS may also be configured to send lockdown command messages to all EDLs in an expanded set of buildings or expanded set of Zones or even all campus.

In an embodiment the ASS uses a rule-based evaluation to determine whether to trigger a Reflex lockdown based on the time sequence of lockdown signal messages and/or the proximity of physical locations of the AB that generated the lockdown signal message. In another evaluation variant the different types of AB (E.g. AB 503L that only puts a single EDL into 'Lockdown' mode, versus other types of AB that can put many EDLs into 'Lockdown' mode) are given a weightage based on their importance (non-limiting example: number of EDL's that an AB can put in 'Lockdown' mode, or if an AB 503L belongs to an EDL that is a gateway to large number of susceptible victims).

In another embodiment, Artificial Intelligence 544 (E.g. machine learning, Artificial Neural Network based cognition method) is used to recognize conditions necessary to trigger a Reflex-lockdown and determine the scope (the set of doors) of the Reflex-lockdown. Machine learning is automatically performed over a period of time, reducing cost of developing and maintaining very complex rule-based logic function. Machine learning allows the system to automatically learn over period of time 'what is NOT an active shooter condition'. This helps reduce type-1 errors in identifying active shooter situation. Machine learning could further be supplemented to learn to recognize an active shooter situation by conducting active shooter drill in the campus, which reduces type-2 errors.

In an embodiment, a facility, building, or zone may be defined with an activation-threshold that triggers automatic lockdown of some or all its constituent EDLs, when an activation function exceeds activation threshold For the purpose of triggering, a user defined activation function is used that is evaluated according to the following expression (1):

Function (time, Set of EDLs with integrated AB 503L that sent 'Lockdown' signal message, Spatial density of EDLs with integrated AB 503L that sent 'Lockdown' signal message)    (1)

In this expression,
time can be any time information, including possibly: the current time; and/or the time since the last Lockdown signal message; and/or the time interval between the last two Lockdown signal messages; and/or an average time interval between the consecutive Lockdown signal messages within the last year, or within the last period indicated by the time argument; or some other time information or value.

"Set of EDLs . . . " is the set (or the number) of those integrated AB 503L in the facility, building or zone which has sent a 'Lockdown' signal message in a time period immediately preceding the current time.

"Spatial density . . . " is the spatial density (for example, number per area) of such ABs 503L.

Further the above function is preferably defined such that:
a. The function increases in each of the "Set of EDLs" argument and "Spatial Density" argument. In other words, when any one of the two arguments increases and the other arguments stay constant, the activation function value increases.
b. The increase is higher when the Lockdown signal messages are more frequent, i.e. the time interval between occurrence of 'Lockdown' signal messages is small (say, if 5 lockdown messages came in 30 seconds, the increase is much higher compared to 5 lockdown messages in 5 minute). Further, the higher the Lockdown message frequency, the greater is the Function increase rate in each of "Set of EDLs" "Spatial Density".
c. The activation function value decreases with the passage of time if no new Lockdown signal messages are received (it could be some combination of a sliding time window or some other window function, or a IIR (Infinite Impulse Response) or FIR (Finite Impulse Response) filter).

A statement that a function "increases" or "decreases" in some selected argument (as the other arguments are held constant) does not mean strict increasing or decreasing at every value of the selected argument. For example, an increasing function may stay constant for some adjacent values of the selected argument or in a sub-range of selected argument's values. Strict increasing or decreasing occurs in at least a sub-range of the selected argument's values, but may or may not occur at every value of the argument. In some embodiments, there is a set of fixed values of the other arguments for which the function stays constant in the selected argument over the entire range of the selected argument's values. In other embodiments, there is no such set of fixed values.

In an embodiment, a facility, building, or zone may be provided with multiple progressively increasing activation function values that result in automatic lockdowns of progressively larger sets of EDLs when the activation function exceeds a minimum threshold.

Another possible activation function, defined for a facility, building, or zone, is as in the following expression (2):

Function (time, Set of EDLs with integrated AB 503L that sent 'Lockdown' signal message, Spatial density of EDLs with integrated AB 503L that sent 'Lockdown' signal message, Set of ABs that sent 'Lockdown' signal message with associated Zone comprising many EDLs) (2)

Here "time", "Set of EDLs", and "Spatial Density" are as for Function (1) above. Function (2) increases or decreases in these arguments the same as Function (1).

The "Set of ABs" argument indicates an importance of the ABs within the Zone. The activation function value increases when the importance increases. For example, each AB can be assigned an importance parameter, and "Set of ABs" can be calculated as the sum of the importance parameters of the ABs that sent the "Lockdown" signal message from the associated Zone. See also the discussion of FIG. 4A below.

The remaining properties of Function (2) can be as described above for Function (1).

Figure 5:
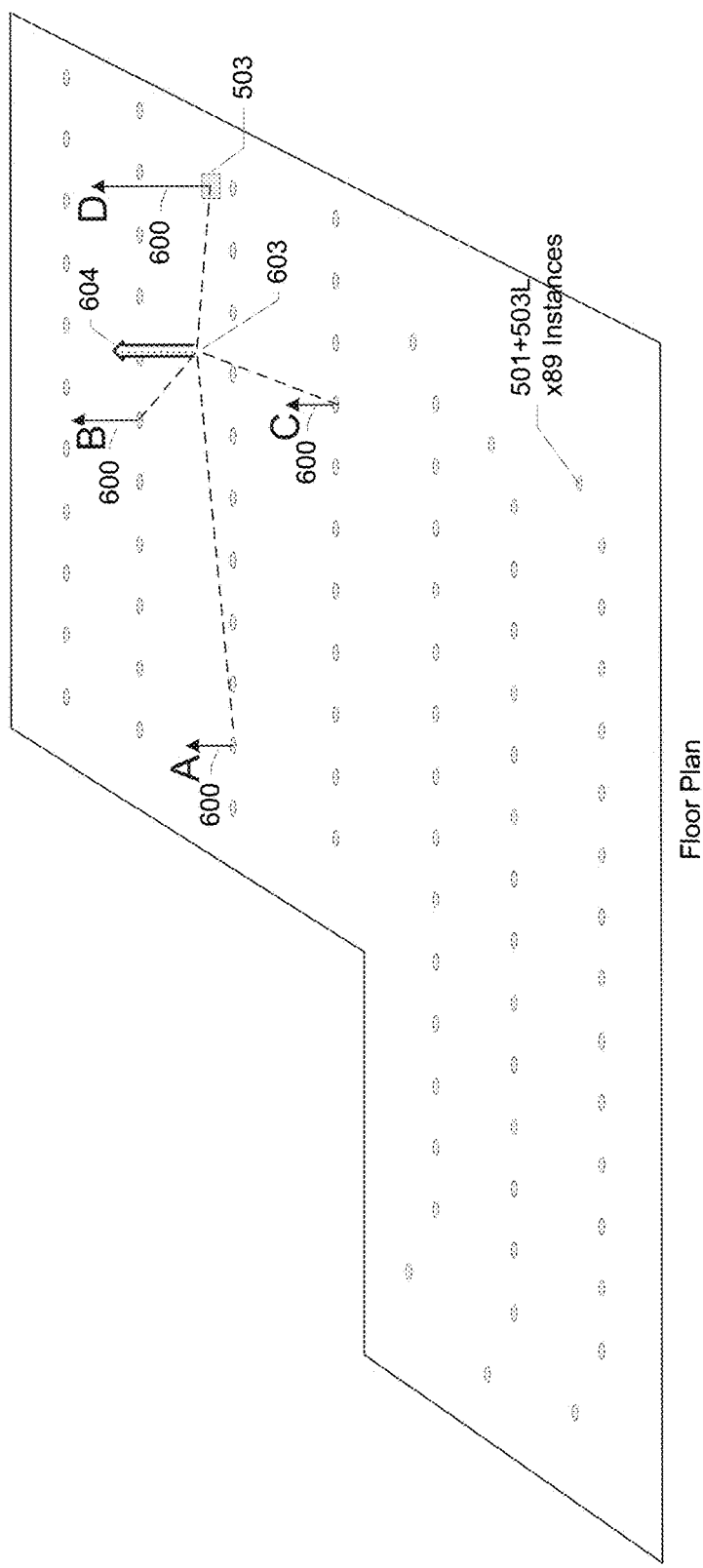
FIG. 5 shows a graphical example of the Center of Activation function of the present disclosure.

Other activation types are possible; some are described below in connection with FIGS. 4A, 4B and 5.

The system can thus be configured such that:
1. Rapid LLD of a few proximate EDLs can automatically lock down a building. This can be done by defining the activation function and an activation threshold such that even when the "Set of EDLs" and "Spatial Density" parameters are fairly low, the activation function exceeds the respective threshold.
2. Rapid LLD of many proximate EDLs can automatically lock down a building, as well as neighboring buildings. For example, a separate, lower activation threshold can be defined for the same activation function as described immediately above. If the higher activation function is exceeded, a predefined set of neighboring buildings is locked down.

One could alternatively build similar functions using statistical mathematics, artificial intelligence and machine learning to recognize conditions necessary to trigger a reflex lockdown as well as the scope (the set of doors) of the lockdown. These are non-limiting examples.

FIG. 4A shows a non-limiting example of an embodiment. It shows Lockdown signal messages (A, B, C, D) from four ABs, where each message has a different weightage impulse depending on the importance of the AB. In the example, signals A and C correspond to EDL ABs 503L from small rooms, while signal B is a panic exit device that allows entry into a hall full of office cubes and thus has higher weightage compared to signals A and C. Signal D corresponds to an AB in the building that puts a zone into lockdown and has even higher weightage.

FIG. 4B shows a trend graph of an exemplary activation function 601 that has a step rise in value that is proportional to the AB's weighted impulse that decays over time (like a high pass filter). Receipt of multiple AB signals in quick succession progressively increases the activation function's value. It should be understood that this is a non-limiting example and there are many other ways to define the activation function.

In an embodiment, the activation function value is derived from Center of Activation function pressure (CoAFP). CoAFP is a useful concept similar to Fluid-Mechanic's center of pressure, whereby the constituent AB's weighted impulse 600 (FIG. 4A) is a vector normal to the surface of the building's floor plan. FIG. 5 shows an example where the resultant Center of Activation function pressure vector 604 due to all ABs' weighted impulses is located on the floor plan location 603 corresponding to the center of pressure due to all ABs' weighted impulse vectors 600 and the ABs' geometric coordinates on the floor plan. In some embodiments the amplitude of an AB's weighted impulse used for the evaluation is the value it had when it was triggered, while in other embodiments the amplitude of an AB's weighted impulse used for the evaluation is the decayed version of initial impulse value (I.e. its current value is less than the value it had when it was triggered. It could be based on one of the many ways to determine the decay functions).

In an embodiment the above method of evaluating Center of Activation function pressure is first calculated to determine the CoAFP vector location 603 on the floor plan and then the CoAFP magnitude is calculated as above (sum of impulses 600) except that a correction factor is given to an AB's weighted impulse 600 (each impulse 600 is weighted with its correlation factor), where the correction factor is higher for an AB with a shorter distance to the CoAFP vector location 603 (E.g. correction factor of 1.6 for an AB located at a shorter distance, compared to correction factor of 0.7 for an AB located at a longer distance). This methodology allows realization of Activation functions that are sensitive to spatial density of ABs that had generated 'Lockdown' signal messages in response to an active shooter scenario.

In an embodiment, the higher is the magnitude of the activation function the greater is its range coverage, i.e. the distance from the Center of Activation function vector location 603 to the EDLs that should be locked down, i.e. put into 'Lockdown' mode. The distance could be measured along a straight line, or in some other way, E.g. as the shortest walking distance. The distance may include weighted lengths, e.g. the shortest working distance can provide a greater weight to a segment with a staircase or elevator.

In another embodiment
a. Given is a set of triggered ABs, each of them associated with a location and a weight (the weight may decay based on the time since triggering).
b. For each EDL in the facility, determine whether to put the EDL into reflex lockdown mode by evaluating this function:
  i. Compute the sum of the weights of all triggered ABs, each scaled by the distance between the EDL and the AB. If the result is above a certain threshold then put the EDL into lockdown mode.

In some embodiments AB 503L could generate a 'Lockdown' signal message irrespective of its host EDL's 501 'Lockdown' mode. This allows the system to know where potential victims have taken refuge as well as their desire to inform others of potential personal harm. AB will generate 'Lockdown' signal message only once; repeatedly pressing the AB will not result in sending the signal again, the signal sending capability will be armed again when the host's EDL operating mode changes to a non-Lockdown mode.

In an embodiment, a facility, building, or zone may be defined with an activation threshold that triggers automatic lockdown of some or all its constituent EDLs. The activation function is continuously evaluated such that if more EDLs become eligible to be put in 'Lockdown' mode due to changing activation threshold and location of the ABs that generate 'Lockdown' signal messages, those additional EDLs are put in 'Lockdown' mode.

In an embodiment of the present disclosure the EDL has a sensor that measures its own temperature and optionally the temperature nearby (for example by using a pyroelectric sensor). The temperature information could be used to build a temperature map (also called a heat map) of the building floors. It is understood that instead of an EDL one can also have a dedicated device (with communication and processing capability similar to that of an EDL) that measures temperature.
  a. When the temperature exceeds a user configured threshold the EDL could send "Hot" signal message (similar to 'Lockdown' signal message described earlier)
  b. When the rate of increase of temperature exceeds a user-configured threshold the EDL could send "Heating" signal message (similar to 'Lockdown' signal message described earlier)

The "Hot" signal message and/or "Heating" signal message could be used similar to the Reflex-Lockdown system describer earlier to generate an alarm for the system operator (E.g. email alert), unlock a set of EDLs (so people in the building can save themselves by exiting through doors that would normally be locked) and possibly interface with the building's fire control system to proactively contain the spread of fire.

Similar to the Center of Activation function described earlier one can also generate 'Center of Temperature-differential' function whose value exceeding a defined threshold could result in generating an alarm message.

Reflex-Lockdown—Failover

The system described thus far is still centrally controlled and dependent on the availability of the ASS which is impacted by unscheduled (E.g. hardware failure, software failure) and scheduled down time (hardware & software maintenance, software upgrade etc). While customers can live with the temporary unavailability of some aspects of ACS functionality (like programming access updates for certain keys for certain EDLs, access log reports), other functionalities (like Lockdown, Reflex lockdown, remotely executing an EDL-Unlock or Lockdown command) are so critical that only a short downtime on the order of a minute is acceptable.

One embodiment of this disclosure is provisioned with a Fall-back application 522 that provides a subset of the functionality of the ASS 502, resulting in graceful degradation of service instead of complete failure. Fall-back application 522 typically runs on a separate computer host 514.

Fall-back application 522 is typically configured to maintain a copy of the critical information 543 that is required for its autonomous operation, such that the information is current (or nearly current) to the information in Core Application 521. When the ASS comes back on line, it synchronizes the critical information that Fall-back application 522 might have modified.

One embodiment of this disclosure is provisioned with a Fall-back application 522 comprising a software application referenced herein as "LCD" 538 (FIG. 2) that provides necessary functionality to implement "Reflex-Lockdown" and remote unlocking of EDLs as taught by this disclosure (see section "DISTRIBUTED REFLEX LOCKDOWN" below). Given its small set of dedicated functions, it is easier to develop and maintain, runs on a small, inexpensive computer platform and is highly reliable.

The Network and Messaging function layer 524 (FIG. 2) provides connectivity to the Fall-back application 522 when it detects that the ASS core application 521 is unavailable. In some cases the Network and Messaging function layer 524 could be running on an independent computer, or SS computer 513, or Failover computer 514.

Figure 10:
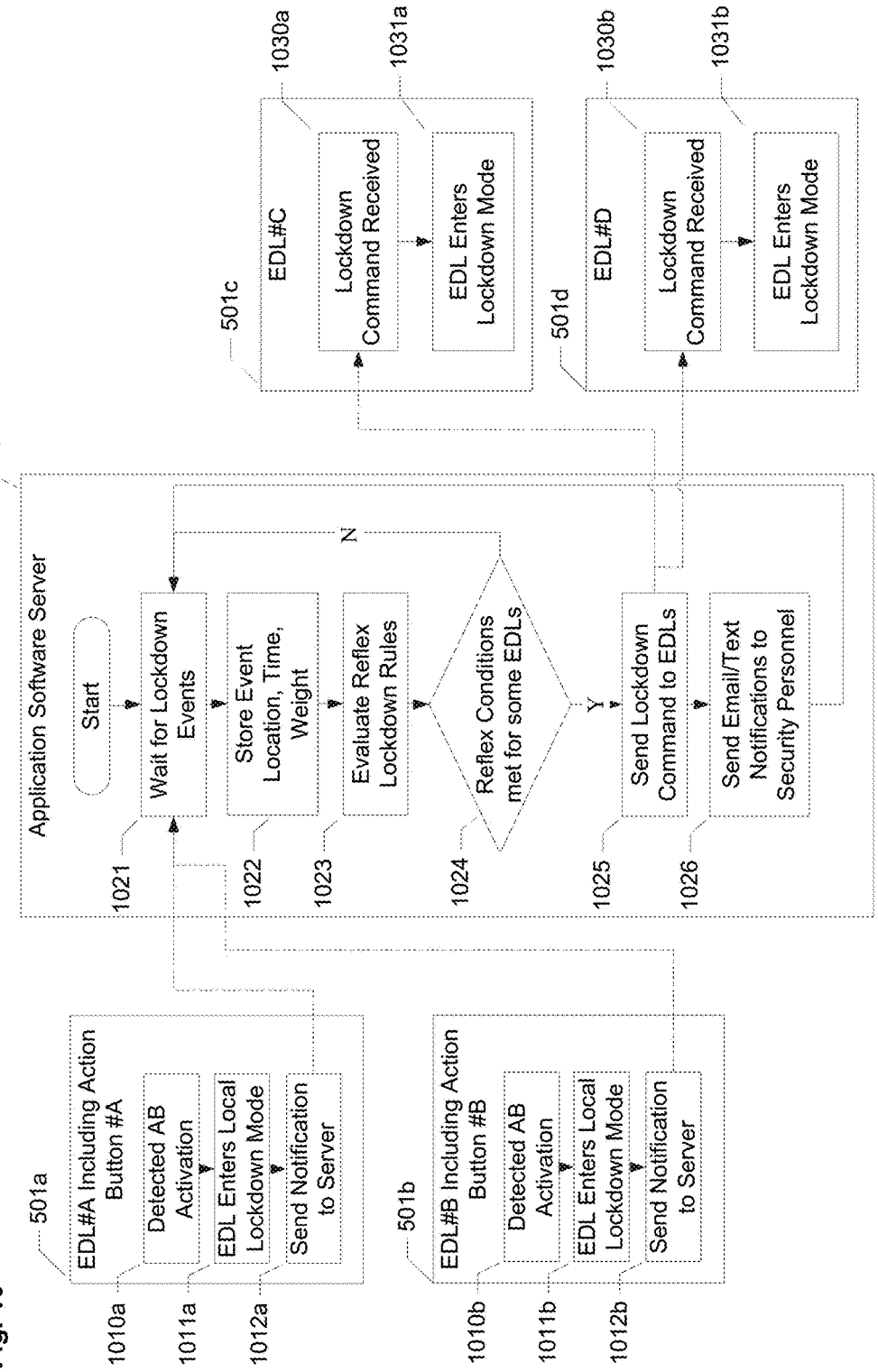
FIG. 10 shows an embodiment of the flowchart of reflex-lockdown of the present disclosure.

FIG. 10 shows a flowchart of how reflex lockdown could be implemented. EDL 501a is an EDL which includes an AB. In state 1010a the EDL detects that the AB has been activated (for example by a user pressing a push-button). In state 1011a, in response to the activation, the EDL configures itself to go into lockdown mode. In state 1012a, the EDL sends a Lockdown Signal Message to the Application Software Server 502. EDL 501b is a second EDL which includes an AB that also gets activated by a user. The reaction is the same as with EDL 501a.

The ASS 502 is normally in a state 1021, waiting to receive Lockdown Signal Messages from EDLs or ABs. After receiving the Lockdown Signal Message from EDL 501a, the ASS enters state 1022 and stores information about the lockdown event, such as location, time, and a weight based on importance. In state 1023 the ASS evaluates rules or functions (such as the function described above) to determine whether or not a reflex lockdown should be triggered and on what set of EDLs. State 1024 represents the decision point: If the requirements for a reflex lockdown are not met, the ASS goes back to state 1021 where it waits for further events. If the requirements are met, the ASS transitions to state 1025 where it sends Lockdown Command Messages to the set of EDLs that was determined in 1023. Then, in state 1026 the ASS sends notifications to security personnel by email, text message, or similar methods.

In this example, EDLs 501c and 501d receive the Lockdown Command Messages in states 1030a and 1030b, respectively. As a response they enter lockdown mode and states 1031a and 1031b.

Distributed-Lockdown

The system described thus far is still centrally controlled and the ASS or its network connection is still a single point of failure. To overcome this limitation requires expensive fault-tolerance computer, network and application software.

This disclosure presents a Distributed-Lockdown (DL) mode of operation that is resilient to failure of the ASS and operates gracefully even if the network system breaks down into multiple disconnected portions of network. This greatly enhances the robustness of AB-initiated lockdown functionality, without entailing cost and complexity of building and maintaining a system that requires fail-safe ASS hardware, ASS software and network.

An embodiment of Router 504 is capable of performing the additional function of a Distributed-Lockdown executor when operating in the Distributed-Lockdown (DL) mode of operation. It has additional control execution functions to implement a distributed operation business logic, where it coordinates and controls downstream network devices (like ABs, Ekeys and EDLs to which it provides network connectivity) and other peer routers that are reachable via the available data network. It also accepts information or command requests from other Routers.

It is to be understood that all communication messages are encrypted. In a preferred embodiment PKI-based encryption mythology is used for mutual authentication and key distribution as explained earlier.

In another embodiment the Router 504 has the ability to detect the loss of communication with the ASS host (or the Backup core application 522), as a result of which it reconfigures itself to change its operating mode to DL mode. It also has ability to detect re-establishment of communication with the ASS host (or the Backup core application 522), as a result of which it reconfigures itself and changes its operating mode as per ASS instructions.

Figure 8:
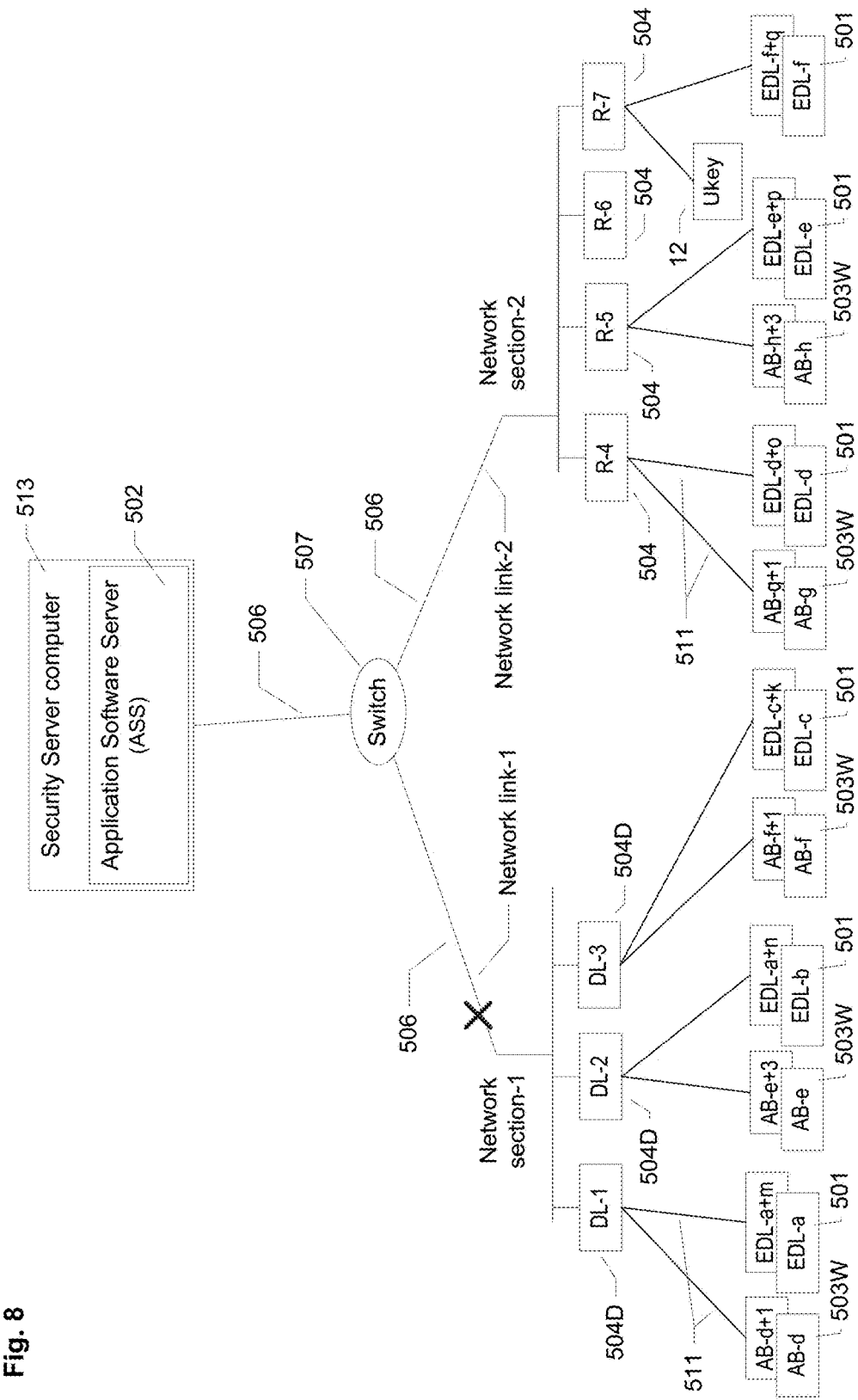
FIG. 8 shows an embodiment of the degraded LAN network and distributed lockdown capability of the present disclosure.

FIG. 8 shows an embodiment of the system, comprising ASS 502 running on SS computer 513 connected to Routers 504 via a data network comprising a collection of network switches 507; the routers 504 provide connectivity to various EDLs 501, ABs 503W, and UKeys 12. When the underlying data network system breaks down due to failure of one or more data networking switches 507 or data links 506, it results in islands of network sections where network devices within the island can only communicate with other network devices within the island's network section. (In FIG. 8 Routers operating in DL mode are annotated by number 504D).

Figure 6:
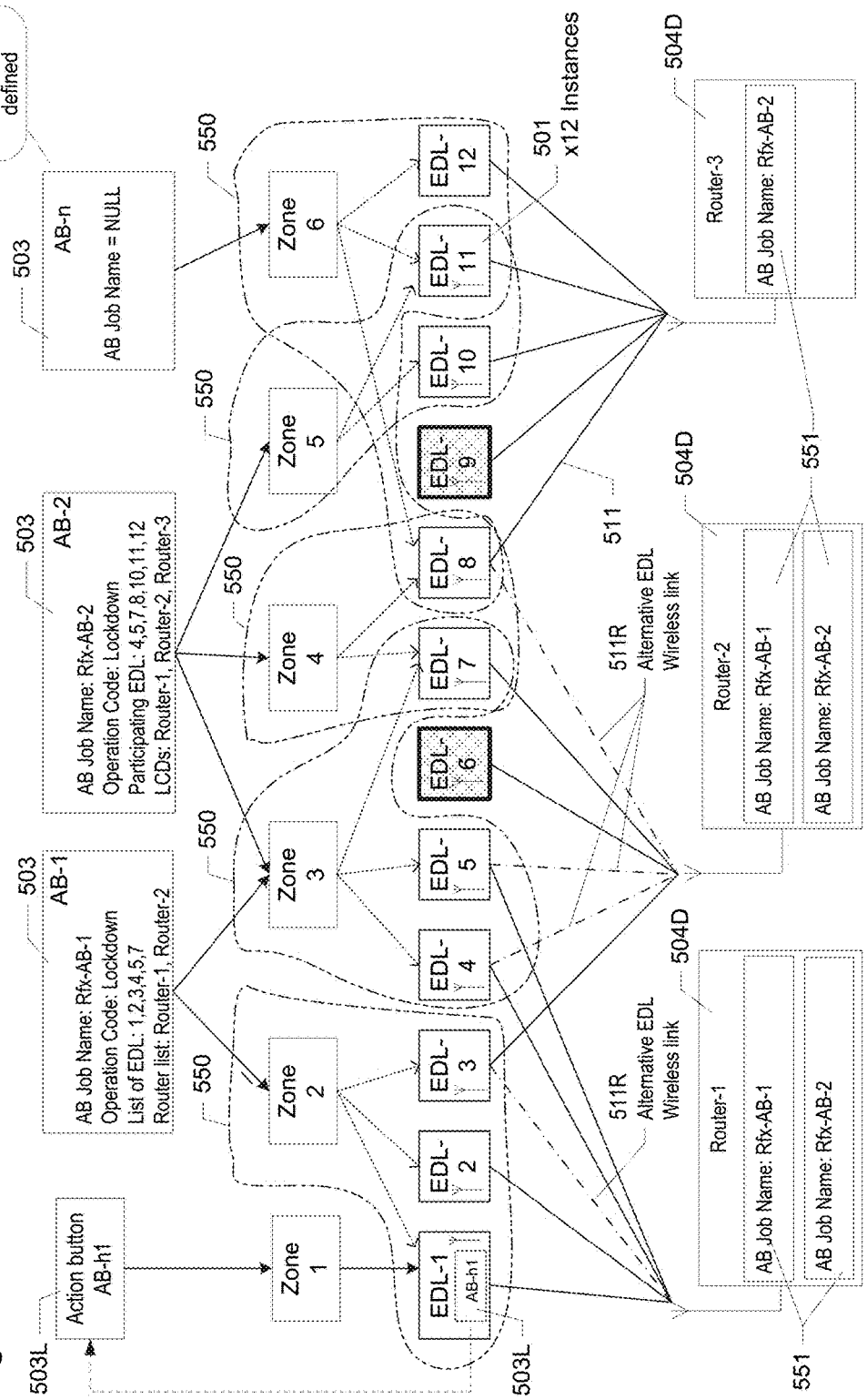
FIG. 6 shows an embodiment of the relationship between AB Job, AB, Zone, EDL and routers of the present disclosure.

FIG. 6 shows an example block diagram of important components that support distributed lockdown functionality. AB's 503 'Lockdown' signal message may have an associated Action Button Job (AB-Job) object comprising:
 a. Object name: A unique string. E.g. concatenation of AB name & Operation Code
 b. Operation code: "Lockdown" (Lockdown is one amongst many other Operation codes. E.g. Unlock, Secure, Arm).
  i. The operation code information data structure may also include other optional parameters that control the behavior of the operation execution (E.g. Lockdown Level, Maximum duration of the Lockdown operation etc.).
 c. List of EDLs: corresponding to the union of EDLs in the Zones that are defined for (connected to) the AB's 'Lockdown' signal message.
  i. For each EDL in the list, one or more of the following: Device-ID, Public cryptographic key, one or more tokens (time-limited or permanent pieces of data) that must correspond to information stored in the EDL to authenticate a lockdown request, etc.
 d. List of Routers: Including all routers that could provide network connectivity to one or more EDLs in the list above (over preferred wireless links 511 and alternative wireless links 511R in FIG. 6). A Router qualifies to be in the list even if it is not the first choice for providing network connection.
  i. For each Router in the list: Router information such as Device-ID, IP Address, network gateway, Public cryptographic key etc.

An AB's other messages (E.g. a Request-Unlock signal message) may similarly have an associated AB-Job object whose operation code may for example be 'Unlock' that results in the list of doors being Unlocked for a configured duration of time.

An exemplary relationship between AB 503, Zone 550 and EDL 501 is shown as per earlier description for FIG. 3

When AB 503 generates a 'Lockdown' signal message it send a message containing a corresponding AB-Job (with Operation code=Lockdown) to the router it is currently connected to (called Head router). The Head router, when receiving the AB's message 551:
 a. determines those EDLs in the AB-Job's List of EDLs that are located downstream of the Head Router and sends them a message commanding them to go into 'Lockdown' mode.
 b. sends a message encapsulating the AB's message 551 (that itself encapsulates the AB-Job) to all other routers (called Tail routers) contained in the AB-Job's Router List that it can currently reach.
 c. The Tail routers receive the message from the Head Router and process the contained AB's message 551. Each tail router determines the set of EDLs that are in the AB-Job's List of EDLs and are located downstream in its network and then sends each of them a message commanding them to go into 'Lockdown' mode. After delivering the messages to the EDLs, the Tail router sends a message to the Head Router indicating completion of the message delivery operation. After getting successful acknowledgement of message receipt from the EDLs, the Tail router sends a message to the Head Router confirming successful completion of the commanded operation.
 d. This ensures that all EDLs in the AB-Job's List of EDLs get the message and go into 'Lockdown' mode.
 e. The Head router, after getting all messages from downstream devices and Tail Routers confirming successful completion of the commanded operation, informs the AB of the progress and completion of the requested 'Lockdown' operation.

Figure 7:
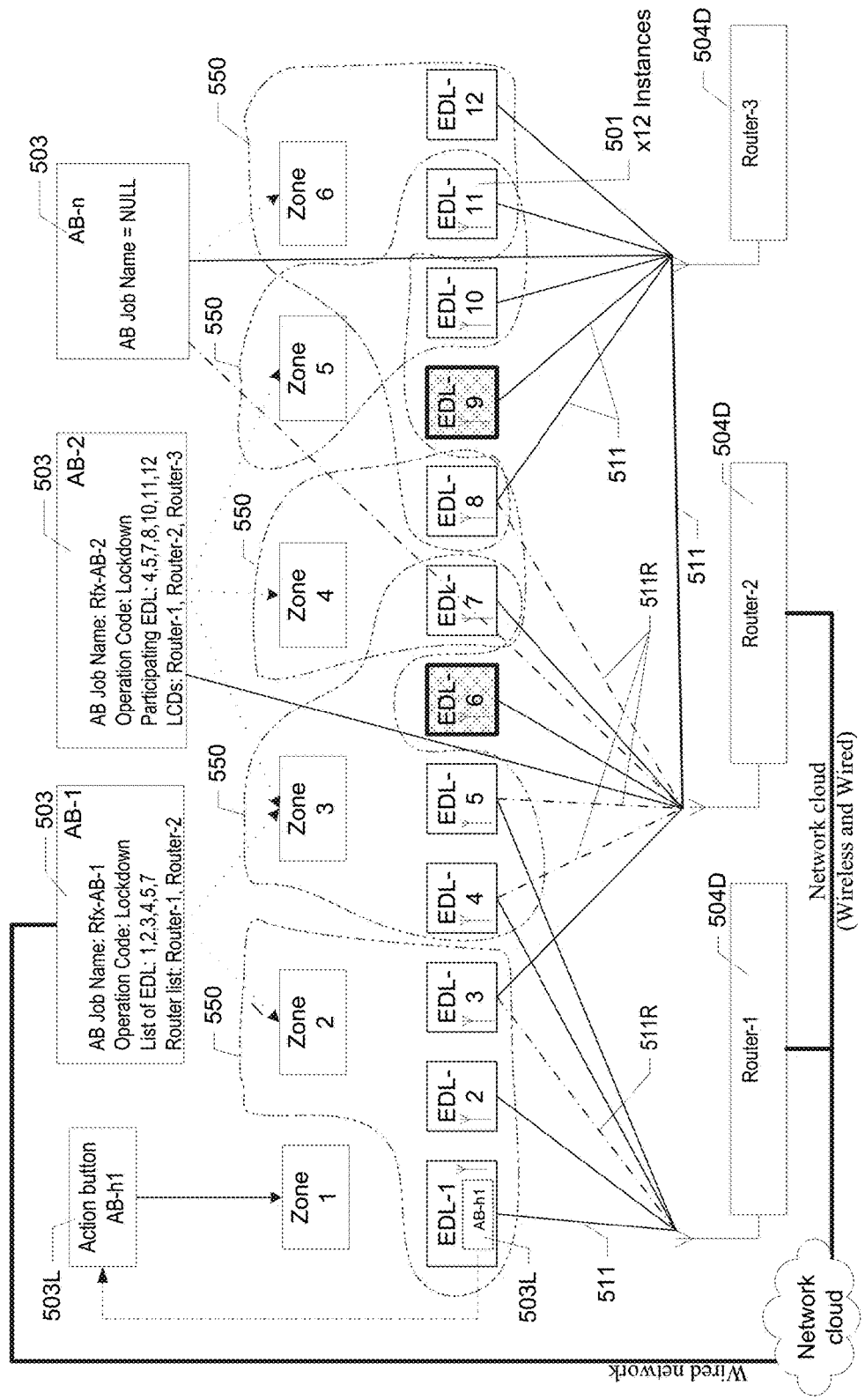
FIG. 7 shows an embodiment of the distributed system that implements distributed lockdown capability of the present disclosure.

FIG. 7 more clearly shows some of the possible network connections between various components that could not be shown in FIG. 6. Thus network communication between ABs and Routers could be wired or wireless. Similarly, routers like Router-3 could be wirelessly connected to other routers.

When ABs and Routers have network connectivity with the ASS they synchronize their AB-Job objects with the information in the ASS (recall that some Routers may be implementing hardwired AB 503. See FIG. 1). For example, the AB-Job's 'List of EDLs' is determined from the zones associated with the AB's 'Lockdown' signal message. The ASS keeps a historical record of Routers that are visible from each AB and EDL, and thus can determine for each AB its AB-Job's 'List of Routers'.

An example of graceful degradation can be seen using FIG. 6, whereby if the Router-3 does not have network connectivity, The Head router receiving AB-2's message 551 sends a message encapsulating the AB's message 551 (that itself encapsulates the AB-Job) to all other routers (not including itself) contained in the AB-Job's Router List that it can currently reach. Thus only EDL-10,11,12 that are in AB-2's AB-Job "Rfx-AB-2" can only be reached by Router-3 fail to operate as per the AB-Job, while other EDLs in the AB-Job perform the operation.

Generally during network failure the network system breaks down into multiple disconnected portions of network, where routers located in a building continue to have connectivity with each other, and in some cases the routers are also able to connect to routers in some other buildings. Distributed Lockdown capability described in this disclosure is able to provide valuable albeit restricted service in such network failure scenarios.

FIG. 11 shows an activity diagram that illustrates how a distributed lockdown could be implemented. Application Software Server 502 first configures AB 503W by sending message 1110 to the AB which includes the description of an AB Job A. In this example the AB Job specifies three EDLs (EDL A, B, C) and two routers (Router A, B) that can be used to communicate with the EDLs. The AB stores that job in its memory.

Activity 1120 represents the activation of AB 503W by user 13. After activation, the AB transmits its job description (message 1121a) to router 504a which is the router that the AB is connected with (head router). Router 504a reads the AB Job and determines that it has connectivity with EDL 501a, which is one of the EDLs included in the job. The router sends lockdown command message 1122a to that EDL.

Router 504a further determines that more EDLs need to be locked down that are not directly connected, but may be connected to router 504b which is also included in the AB Job. Therefore router 504a sends a message 1121b, including the AB Job description, to router 504b (tail router). Router 504b sends lockdown command messages 1122b and 1122c to EDLs 501b and 501c, respectively.

After successful transmission of the lockdown command messages, router 504b sends acknowledgment 1123b to router 504a, which in turn sends acknowledgment 1123a back to the originating AB 503W. In 1130, the AB notifies the user of the successful execution of the lockdown.

Distributed Reflex Lockdown

The Reflex-Lockdown system described thus far is still centrally controlled and the ASS or its network connection is still a single point of failure. To overcome this limitation requires expensive fault-tolerance computer, network and application software.

This disclosure provides a Distributed-Reflex-Lockdown (DRL) mode of operation that is resilient to failure of ASS and operates gracefully even if the network system breaks down into multiple disconnected portions. This greatly enhances the robustness of the AB-initiated Reflex-lockdown function, without entailing cost and complexity of building and maintaining a system that requires fail-safe ASS hardware, ASS software and network.

An embodiment, Router 504 is capable of performing the additional function of a Local Coordinator when operating in Local Coordinator Device (LCD) mode of operation. It has additional control execution functions to implement a distributed operation business logic, where it supervises, coordinates and controls routers that are reachable via the available data network and operating in Distributed-Lockdown (DL) mode of operation. Routers in DL mode of operations negotiate among themselves such that one amongst them take on the additional function of Local Coordinator and operate in 'LCD' mode. The Local Coordinator also provides the regular functionality of router's DL mode (i.e. for the hosting router).

Figure 9:
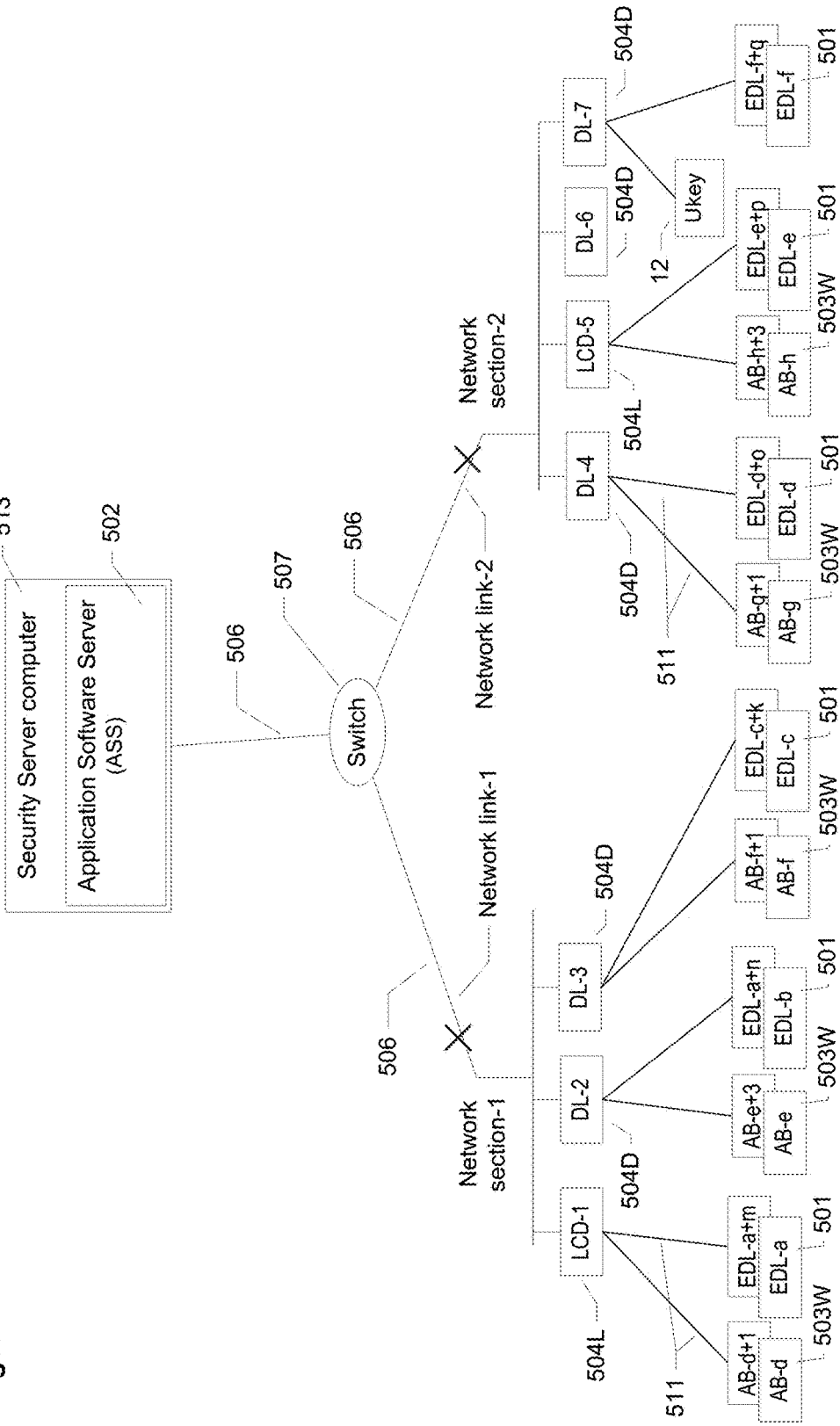
FIG. 9 shows an embodiment of the degraded LAN network and distributed reflex-lockdown capability of the present disclosure.

FIG. 9 shows an embodiment of Reflex-Lockdown system, comprising ASS 502 running on SS computer 513, connected to Routers 504 via a data network comprising a collection of network switches 507; the routers 504 provide connectivity to various EDLs 501, ABs 503, and UKeys 12. When the underlying data network system breaks down due to failure of one or more data networking switches 507 or data links 506, it results in islands of network sections where network devices within the island can only communicate with other network devices within the same island's network section. (In FIG. 9 Routers operating in LCD mode are annotated by number 504L and routers operating in DL mode are annotated by number 504D)

A router 504L in LCD mode provides Reflex lockdown functions for all EDLs that are reachable via the connectivity provided by the current state of the network (E.g. Network section-1 in FIG. 9).

In an embodiment, the Routers 504 have ability to detect loss of communication with the ASS host (or the Backup core application 522) as a result of which it reconfigures itself to change its operating mode to DL mode. It also has ability to detect re-establishment of communication with the ASS host (or the Backup core application 522) as a result of which it reconfigures and change its operating mode as per ASS instruction.

After all Routers 504 in an island network section change their operating mode to 'DL' mode, they perform the following operations:
   a. Use a communication protocol to discover each other's presence so that they can communicate with each other.
   b. negotiate among themselves such that one amongst them take on the additional function of Local Coordinator and that router 504 changes its operating mode to operate in 'LCD' mode.

The LCD router 504L performs the function of Reflex Lockdown using similar function and methodology as the ASS as described in the section titled "REFLEX LOCKDOWN" above, except that:
   a. the associated ABs are those that are connected to routers in the island network section and
   b. LCD 504L's communication and command capability is limited to a sub-set of the EDLs that are reachable from the LCD.

An Ekey and an EDL may have electronic components as described, for example, in US pre-grant publication US 2006/0164208 A1, incorporated herein by reference, or US 2013/0247153 A1, incorporated herein by reference. The Ekey and EDL components can be modified to provide the functionality according to some embodiments of the present invention. For example, the EDL may have a memory that stores its normal operation schedule, i.e. the various times at which circuit Ekeys, identified by IDs in the memory, have access to the EDL, i.e. can unlock the EDL. The EDL memory may store a different set of Ekey identifiers that have access in the lockdown mode, or at each grade of lockdown as described above.

When an AB and/or a Router have network connectivity with the ASS they periodically synchronize their AB-Job objects as well as the information model for Reflex-Lockdown. Routers may further download from the ASS the operative programming for analyzing, processing and operating on AB signal messages.

Some embodiments are defined by the following numbered clauses:
1. (Local Lockdown clauses) An ACS comprising electronic door locks (EDLs), an application software server (server), and a means for the EDLs to communicate with the server, wherein said EDLs can operate in two different modes: In a first mode (e.g. Normal mode), granting access to all authorized users' Ekeys with access permission, and in a second mode (e.g. Lockdown mode), granting access to a smaller set of authorized users' Ekeys with access permission. Said EDLs having a user input method by which the user can switch an EDL from the first mode to the second mode (and optionally back to the first mode. The EDLs notifying the server of this mode change.
2. The system from [1] (i.e. the system according to clause 1), further comprising Ekeys that are in possession of respective users and that can be read by EDLs, requiring an authorized user's Ekey that is permitted to change EDL's operating mode be read by EDL before EDL allows the user to change its operating mode.
3. A system of clause [2] where the set of authorized users' Ekeys that are permitted to change EDL's operating mode to Lockdown mode is different from the set of an authorized users' Ekeys that are permitted to change EDL's operating mode out of Lockdown mode.
4. A system of clause [3] where the set of an authorized users' Ekeys that are permitted to change EDL's operating mode to Lockdown mode is same as the set of Ekeys that have access permission to unlock the EDL when the EDL is in 'Normal' mode of operation.
5. A system of clause [2] wherein the EDL allows changing the EDL's operating mode within a configured period of time after successfully reading the Ekey of an authorized user.
6. A system of clause [2] wherein EDL has capability to read Ekey from exterior side of the door as well from the interior side of the door.

7. A system of clause [1] further comprising a video camera system wherein when the EDL notified the server of this operating mode change to 'Lockdown', the server communicates with the video camera system to steer a video camera towards the EDL, record the video and send a communication to the system operator indicating availability of the specific video stream.
8. (For copying) An ACS that contains electronic door locks (EDLs), an application software server (server), and a means for the EDLs to communicate with the server, wherein said EDLs can operate in two different modes: In a first mode, granting access to all authorized users' Ekeys with access permission, and in a second mode, granting access to a smaller set of authorized users' Ekeys with access permission. Said EDLs having a user input method by which the user can switch an EDL from the first mode to the second mode (and optionally back to the first mode). The EDLs notifying the server of this mode change.
9. (Remote Lockdown clauses) An ACS comprising electronic door locks (EDLs), Action buttons (AB), Routers, an application software server (server), Application user interface and a means for the AB and EDLs to communicate with the Router and server, Wherein the said EDL operates in non-Lockdown modes and 1 to K grades of Lockdown modes, wherein AB and/or application user interface having a user input method by which the user and/or an autonomous application software can set of EDLs operating mode to a specific mode, where when a EDL is:
   a. In Open mode the EDL unlocks and stays that way
   b. In normal mode the EDL grants access to an Ekey set T0 with set element count of M
   c. In Lockdown level 1 the EDL grants access to Ekey set T1 with set element count of N where N<M
   d. In Lockdown level 2 the EDL grants access to Ekey set T2 with set element count of O where O<N
   e. . . .
   f. In Lockdown level K−1 the EDL grants access to Ekey set Tk−1 with set element count of P where P<O
   g. In Lockdown level K the EDL grants access to Ekey set Tk with set element count of Q where Q<P
10. A system of clause [9] wherein the EDL accepts 'Lockdown test' message that simulates 'Lockdown' message behavior, such that user of the system can perform test verification on a set of connected EDL.
11. [Reflex lockdown] A system of clause [9] wherein the server is configured such that when it receives two or more 'Lockdown' signal messages from separate ABs within temporal and/or spatial proximity of each the server triggers execution of reflex-lockdown workflow that automatically changes the operating mode of a set of EDLs to Lockdown mode.
12. a system of clause [11] wherein the set of EDL correspond to all EDLs in the buildings where the AB that generated the lockdown signal message is located.
13. a system of clause [11] wherein Artificial Intelligence is used to recognize conditions necessary to trigger execution of reflex-lockdown workflow and determine the set of EDLs should be put in Lockdown mode.
14. a system of clause [11] wherein multiple progressively increasing activation function value result in lockdowns of progressively larger sets of EDLs, when the activation function exceeds a minimum threshold.
15. a system of clause [11] wherein the server triggers execution of reflex-lockdown workflow by repeatedly evaluating an activation function against a set threshold, where the Activation function is a Function of (time, Set of EDLs with integrated AB 503L that sent 'Lockdown' signal message, Spatial density of EDLs with integrated AB 503L that sent 'Lockdown' signal message, Set of ABs that sent 'Lockdown' signal message with associated Zone comprising many EDLs)
Further the above function is defined such that:
   a. EDLs with integrated AB 503L that have sent a 'Lockdown' signal message in close proximity increase the activation function value
   b. EDLs with integrated AB 503L that have sent a 'Lockdown' signal message within a short time period greatly increase the activation function value
   c. ABs that have sent a 'Lockdown' signal message with an associated Zone comprising many EDLs increase the activation function value depending on importance of the EDLs in the AB's Zone(s).
   d. The Activation function value decays as time elapses (it could be some combination of a sliding time window or some other window function, or a IIR (Infinite Impulse Response) or FIR (Finite Impulse Response) filter).
16. a system of clause [11] wherein activation function value is proportional to CoAFP.
17. a system of clause [11] wherein activation function value is proportional to modified weighted CoAFP.
18. a system of clause [11] wherein activation function value is computed for each EDL as sum of the weights of all triggered ABs, each scaled by the distance between the EDL and the AB.
19. a system of clause [11] wherein the higher is the magnitude of the activation function the greater is its range coverage (where range is determined as either line of sight or human travel path length), when the activation function exceeds a minimum threshold.
20. The system from [11] where the decision whether to configure a specific EDL to go into the second operating mode is based on a function that takes as input one of more of the following:
   a. The set of activated user input devices.
   b. The times of activation of activated user input devices.
   c. The distance between the EDL and each of the activated user input devices.
   d. Relative weights (for example based on importance) that can be associated with each user input device.
   e. A configurable trigger threshold.
21. The system of clause [9] wherein the server is configured such that when it receives two or more seismic signal messages from separate ABs within temporal and/or spatial proximity of each the server triggers execution of a workflow that automatically changes the operating mode of a set of EDLs to Open mode.
22. (FAILOVER Clause) The system according to any preceding clause, further containing router devices that are part of the network infrastructure connecting the server with EDLs and user input devices. Further, if such a router device discovers that connectivity with the server is interrupted or the server is not functional, it can dynamically take over the server's responsibility of receiving activation notices from user input devices and issuing commands to sets of EDLs to configure them to go into the second operating mode.
23. The system of any preceding clause with router coordinating.
24. The system from [12] where a user input device has a means to communicate with EDLs, and upon activation, issues a command to a preconfigured set of EDLs to configure them to go into the second operating mode.

25. The system from [24] where a user input device has a memory that contains a set of messages, one for each EDL that has been configured to switch to the second operating mode upon activation of said user input device. Said messages being pre-generated by the server and containing information that allows an EDL to verify the message's authenticity, such as a token or a cryptographic signature by the server. A user input device, upon activation, transmits the stored messages to the EDLs.

26. The system from [25] where said pre-generated messages have an expiration date and time or contain a token with limited validity and won't cause an EDL to switch into the second operating mode if they are expired at the time they are received {purpose: AB should not be functional anymore if removed from facility for a certain time}

27. The system from [12] further comprising Ekeys that are in possession of users, where the user input device has the ability to read Ekeys and is configured with a list of authorized users; the user input device further requiring that an Ekey of an authorized user is read in order before it can be activated.

28. The system from [12] where the user input device is implemented by a software program running on a personal computer, tablet, or smartphone that can communicate with the server over a network, and upon a specific user interaction with the software, sends a notification to the server.

29. The system from [12] further comprising Ekeys that are able to communicate with the server and include a user input method (such as a push-button); said Ekeys implementing the function of a user input device, sending a notification to the server when they are activated through the user input method.

30. The system from [12] that additionally contains local coordinator devices able to communicate with user input devices and EDLs, whereby the user input devices notify the local coordinator device when they are activated and the local coordinator device, upon receipt of one or more such notices, issues a command to a set of EDLs to configure them to go into the second operating mode.

31. The system from [12] where the subset of users with access in the second operating mode includes emergency personnel and/or the owners (primary users) of the room.

32. The system from [12] where EDLs can operate in more than two modes, where each subsequent mode further restricts the subset of users that have access compared to the previous mode. {more general: where in each mode a different subset of authorized users can be configured to have access}

33. An ACS comprising electronic door locks (EDLs), one or more application software server (server), one or more Smart-router(s) that operate in fault resilient mode such that upon user command to lock down her set of doors by using a command input device, the command input device communicates (via a crypto secure communication means) to a Smart router amongst a set of designated Smart-router, that operates autonomously when it determines that the server is not fully operational, such that:
   a. It determines from the user command the first set of EDLs that should be put in lock-down
   b. It securely communicates the lock-down command to the subset of first set of EDL that are in its wireless network, using cryptographically secure communication means
   c. It further determines a second set of EDL comprising the first set of EDL less the EDLs that are in its wireless network
   d. For each EDL in the second set of EDL it determines one or more other Smart-routers that could provide connectivity to the EDL, and send a crypto secured message to the Smart routers requesting to convey lock down command to the EDL.

34. [33] whereby upon completion of lockdown of all relevant door locks the smart-router notifies the command input device that the lockdown completed executed, which in turn provides feedback to the operator.

35. Prank proof Lockdown whereby the EDL will allow use of Lockdown button only if at least one of the following condition is true
   a. the EDL to LR-Ekey RF communication path loss is less than a configured threshold
   b. The current time is less than the configured timeout period since the time when Ekey with access permission to door was read.

36. Ekey with AB has list of EDL on which it is capability of issuing lockdown. The Ekey's list of AB can be remotely updated by ACS/ASS 37. EDL has list of Ekeys that are permitted to change EDL mode to 'Lockdown'. The permission can be remotely updated by ACS/ASS

38.

39. Above #20+(clause 20 wherein) AB has information of scheduled (start-end time+days of week) enabling of EDLs that can be put to lockdown the by the Ekey.

40. Above #20+EDL has information scheduled (start-end time+days of week) enabling of EDLs that can be put to lockdown the by the Ekey.

41. A router that reconfigures itself when it loses network connectivity with the ASS to operate autonomously serving its downstream devices of business logic and as needed communicating and commanding peer routers to implement the business logic 42. A router that reconfigures itself when it loses network connectivity with the ASS to operate as Local Controller where it supervises, coordinates and controls routers that are reachable via the available data network and operating in Distributed-Lockdown (DL) mode of operation.

43. autonomously serving its downstream devices of business logic and as needed communicating and commanding peer routers to implement the business logic.

Embodiments of the disclosure described above are exemplary only. One skilled in the art may recognize various alternative embodiments from those specifically disclosed. Those alternative embodiments are also intended to be within the scope of this disclosure. As such, the disclosure is limited only by the following claims.

The invention claimed is:

1. An electronic door lock (EDL) comprising an interface for receiving a first command to switch from a first mode to a second mode, the first command being a Lockdown command issued in response to one or more user Lockdown requests initiated by one or more users, wherein: in the first mode, the EDL is locked but grants access to a first set of electronic keys; and in the second mode, the EDL is locked but grants access to a smaller set of electronic keys (Ekeys) than in the first mode; wherein the EDL is configured to notify a server over a network of a change from the first mode to the second mode.

2. The EDL of claim 1 wherein the EDL is configured to execute the first command only if the EDL recognizes an Ekey authorized to place the EDL into the second mode.

3. The EDL of claim 2 wherein the EDL is also operable to receive and execute a second command to leave the second mode, wherein the EDL is configured to execute the second command only if the EDL recognizes an Ekey authorized to cause the EDL to leave the second mode, wherein a set of Ekeys authorized to place the EDL into the second mode is different from a set of Ekeys authorized to cause the EDL to leave the second mode.

4. The EDL of claim 3 wherein the set of Ekeys authorized to cause the EDL to leave the second mode is identical to a set of Ekeys authorized to unlock the EDL in a mode other than the second mode.

5. The EDL of claim 2 wherein the EDL is configured to execute the first command only within a predefined period of time after the EDL recognizes an Ekey authorized to place the EDL into the second mode.

6. The EDL of claim 2 wherein the EDL is configured to execute the first command only if the EDL recognizes an Ekey located either on a first side of the EDL or on a second side of the EDL, wherein the EDL is suitable for controlling access through a door of a room, the first side being at the room's interior, the second side being at the room's exterior.

7. A system comprising the EDL of claim 1 and a video camera which, in operation, in response to the EDL notifying the server, is steered to record an area comprising the EDL and to send a network communication indicating availability of the video.

8. The system of claim 7 wherein the video camera is steered remotely by the server in response to the EDL notifying the server.

9. The EDL of claim 1 wherein each said Lockdown request is initiated by a user using an action button.

10. An electronic door lock (EDL) comprising a plurality of modes of operation, each mode being associated with a set of electronic keys (Ekeys) operable to unlock the EDL, wherein different modes are associated with respective different sets of Ekeys;
   wherein said modes comprise a plurality of Lockdown modes and, in addition, a Normal mode;
   wherein for every two of said modes, one of the modes is associated with the larger set of Ekeys and the other one of the modes, the Normal mode being associated with the largest set of Ekeys.

11. The EDL of claim 10 further comprising an Open mode in which the EDL is always open.

12. The EDL of claim 10 wherein the EDL is operable to enter any one of the Lockdown modes in response to a network communication, and to send a network communication indicating entry into the corresponding Lockdown mode;
   wherein upon receipt of a Lockdown Test network communication, the EDL is operable to send the network communication indicating entry into the corresponding Lockdown mode without the EDL entering into the corresponding Lockdown mode.

13. A system comprising an apparatus for controlling a plurality of electronic door locks (EDLs), the apparatus being operable to receive action button (AB) Lockdown signal messages from ABs, to determine from the AB Lockdown signal messages whether one or more conditions have occurred that correspond to a set of EDLs, and to send a Lockdown message to each EDL of the set to cause the EDL to enter a Lockdown mode;
   wherein the set of EDLs is determined based on temporal proximity of the AB Lockdown signal messages, and/or spatial proximity of physical locations of the ABs that generated the Lockdown signal messages.

14. The system of claim 13 wherein the set of EDLs consists of all the EDLs in a building containing at least one AB whose AB Lockdown signal message is received.

15. The system of claim 13 wherein the one or more conditions are determined by an automatic computation using machine learning.

16. The system of claim 13 wherein the one or more conditions are determined using a function of:
   time information;
   Set of EDLs each of which comprises an AB that sent an AB Lockdown signal message, and
   Spatial density of EDLs each of which comprises an AB that sent an AB Lockdown signal message.

17. The system of claim 16 wherein either progressively increasing or progressively decreasing function values result in corresponding progressive increase of the set of the EDLs.

18. The system of claim 16 wherein said function also depends on an importance parameter of each AB whose AB Lockdown signal message has been received within a time defined by the time information.

19. The system of claim 16 wherein the function value is determined using a Center of Activation function pressure.

20. The system of claim 16 wherein the function value is determined using a modified weighted Center of Activation function pressure.

* * * * *